(12) United States Patent
Zheng et al.

(10) Patent No.: US 12,506,495 B2
(45) Date of Patent: Dec. 23, 2025

(54) POLAR ENCODING METHOD AND APPARATUS AND POLAR DECODING METHOD AND APPARATUS

(71) Applicant: HUAWEI TECHNOLOGIES CO., LTD., Guangdong (CN)

(72) Inventors: Mengfan Zheng, London (GB); Cong Ling, London (GB); Jiaqi Gu, Shenzhen (CN); Mengyao Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 165 days.

(21) Appl. No.: 18/532,211

(22) Filed: Dec. 7, 2023

(65) Prior Publication Data

US 2024/0120939 A1 Apr. 11, 2024

Related U.S. Application Data

(63) Continuation of application No. PCT/CN2022/093800, filed on May 19, 2022.

(30) Foreign Application Priority Data

Jun. 11, 2021 (CN) .......................... 202110653044.4

(51) Int. Cl.
*H03M 13/29* (2006.01)
*H03M 7/14* (2006.01)
(52) U.S. Cl.
CPC ..................................... *H03M 7/14* (2013.01)
(58) Field of Classification Search
CPC .. H03M 13/09; H03M 13/13; H03M 13/6312; H03M 7/14
See application file for complete search history.

(56) References Cited

U.S. PATENT DOCUMENTS 11,063,611 B2 * 7/2021 Huang .................. H03M 13/09
11,502,780 B2 * 11/2022 Huang .............. H03M 13/2906
(Continued)

OTHER PUBLICATIONS

Yi Fang et al, "A Survey on Protograph LDPC Codes and Their Applications," IEEE Communications Surveys and Tutorials, (2015); 27 total pages.
(Continued)

*Primary Examiner* — Lam T Mai
(74) *Attorney, Agent, or Firm* — Rimon PC

(57) ABSTRACT

This application discloses a polar encoding method and apparatus and a polar decoding method and apparatus, to apply polar codes to source coding and decoding, to improve source coding and decoding performance. The method may be implemented by using the following steps: obtaining to-be-encoded source bits; performing first polar encoding on the to-be-encoded source bits to obtain encoded source bits, where the first polar encoding includes first transformation and second transformation, the first transformation is a polarization transformation, a mother code length corresponding to the first transformation is Ns, the polarization transformation is performed on the to-be-encoded source bits to obtain first source bits, and the second transformation is performed on the first source bits to obtain the encoded source bits; determining assistance information based on the first source bits; and outputting a source coding codeword, where the source coding codeword includes the encoded source bits and the assistance information.

19 Claims, 17 Drawing Sheets

(56) References Cited

U.S. PATENT DOCUMENTS

| | | | | |
|---|---|---|---|---|
| 11,791,844 B2* | 10/2023 | Ebrahimzad | ......... | H03M 13/611 |
| | | | | 714/776 |
| 12,107,605 B1* | 10/2024 | Farsiabi | ............. | H03M 13/1171 |
| 12,170,530 B1* | 12/2024 | Farsiabi | ................ | H03M 13/13 |
| 12,375,105 B2* | 7/2025 | Bioglio | ............... | H03M 13/616 |
| 2019/0349002 A1* | 11/2019 | Zhou | ................... | H03M 13/13 |
| 2021/0152290 A1* | 5/2021 | Li | ......................... | H04L 1/0067 |
| 2022/0174329 A1* | 6/2022 | Li | ......................... | H04N 19/91 |
| 2023/0421417 A1* | 12/2023 | Wang | ............... | H04L 25/03828 |
| 2024/0014925 A1* | 1/2024 | Li | ......................... | H04L 1/0041 |
| 2024/0031058 A1* | 1/2024 | Qin | ........................ | H04L 1/0042 |
| 2024/0039777 A1* | 2/2024 | Meng | ................... | H04L 1/0067 |
| 2024/0056217 A1* | 2/2024 | Qu | .......................... | H04L 1/08 |
| 2024/0073066 A1* | 2/2024 | Boehnke | ............... | H04L 1/0057 |
| 2024/0137047 A1* | 4/2024 | Tong | .................... | H04L 1/0057 |
| 2024/0137147 A1* | 4/2024 | Jin | ........................ | H04L 1/0013 |
| 2024/0137151 A1* | 4/2024 | Farsiabi | ................ | H04L 1/0066 |
| 2024/0214005 A1* | 6/2024 | Chen | ........................ | H04L 1/00 |
| 2024/0243759 A1* | 7/2024 | Bioglio | .............. | H03M 13/612 |
| 2024/0243847 A1* | 7/2024 | Qin | ........................ | H04L 1/0041 |
| 2024/0259124 A1* | 8/2024 | Sun | ..................... | H04L 27/2602 |
| 2024/0283562 A1* | 8/2024 | Wang | ................... | H04L 1/0045 |
| 2024/0284479 A1* | 8/2024 | Liu | ..................... | H04W 52/365 |
| 2024/0284519 A1* | 8/2024 | Li | ........................ | H04W 74/006 |
| 2024/0340697 A1* | 10/2024 | Yao | .................... | H04B 7/18513 |
| 2024/0348324 A1* | 10/2024 | Gan | .................. | H04B 7/18513 |
| 2024/0348368 A1* | 10/2024 | Ivanov | ............. | H03M 13/2906 |
| 2024/0388411 A1* | 11/2024 | Ma | .................... | H04L 27/2646 |
| 2024/0429999 A1* | 12/2024 | Qian | ...................... | H04B 7/185 |
| 2025/0023761 A1* | 1/2025 | Xie | .......................... | H04L 5/00 |
| 2025/0038884 A1* | 1/2025 | Li | ......................... | H04L 1/0043 |
| 2025/0047411 A1* | 2/2025 | Bioglio | ................ | H04L 1/0045 |
| 2025/0047416 A1* | 2/2025 | Li | ......................... | H04L 1/0057 |
| 2025/0080268 A1* | 3/2025 | Qin | ....................... | H04L 1/0003 |
| 2025/0088311 A1* | 3/2025 | Wang | ............... | H03M 13/6561 |
| 2025/0096957 A1* | 3/2025 | Liu | ....................... | H04L 1/1607 |
| 2025/0119234 A1* | 4/2025 | Wang | .................... | H04L 1/0009 |
| 2025/0141473 A1* | 5/2025 | Tong | .................... | H04L 1/0002 |
| 2025/0150999 A1* | 5/2025 | Luo | ................... | H04W 56/0015 |
| 2025/0167914 A1* | 5/2025 | Tong | ..................... | H04L 1/0011 |
| 2025/0168052 A1* | 5/2025 | Jiang | ....................... | H04L 7/042 |
| 2025/0233697 A1* | 7/2025 | Jassal | ................ | H04W 28/0268 |
| 2025/0240194 A1* | 7/2025 | Qin | ........................ | H04L 1/0061 |

OTHER PUBLICATIONS

Yury Polyanskiy et al, "Channel Coding Rate in the Finite Blocklength Regime," IEEE Transactions on Information Theory, vol. 56, No. 5, May 2010, pp. 2307-2359; (53 total pages).

Ying Wang et al, "Exploiting Source Redundancy to Improve the Rate of Polar Codes," 2017 IEEE International Symposium on Information Theory (ISIT), pp. 864-868; (5 total pages).

Victoria Kostina et al., "Fixed-length lossy compression in the finite blocklength regime," arXiv:1102.3944v3 [cs.IT], Feb. 4, 2014; 30 total pages.

Chen Chen et al, "Joint Optimization of Protograph LDPC Code Pair for Joint Source and Channel Coding," IEEE Transactions on Communications (2018), total 13 pages.

Mng Wang et al, "Joint Source-Channel Decoding of Polar Codes for Language-Based Source," arXiv:1601.06184v1 [cs.IT], Jan. 22, 2016; 20 total pages.

Victoria Kostina et al, "Lossy joint source-channel coding in the finite blocklength regime," arXiv:1209.1317v2 [cs.IT], Feb. 4, 2014; 32 total pages.

Kai Niu and Kai Chen, "CRC-Aided Decoding of Polar Codes," IEEE Communications Letters, vol. 16, No. 10, Oct. 2012; 4 total pages.

Harm S. Cronie et al., "Lossless Source Coding with Polar Codes," ISIT 2010, Austin, Texas, U.S.A., Jun. 13-18, 2010; 5 total pages.

Semih Cayci et al., "Lossless Polar Compression of q-ary Sources," Jul. 7, 2013 (Jul. 7, 2013); pp. 1132-1136, (5 total pages).

Mohammad Abu Hanif et al., "An Efficient Serially Concatenated Polar Code with Unequal Error Protection Property," Feb. 23, 2019 (Feb. 23, 2019); pp. 497-501, (5 total pages).

* cited by examiner

POLAR ENCODING METHOD AND APPARATUS AND POLAR DECODING METHOD AND APPARATUS

CROSS-REFERENCE TO RELATED APPLICATIONS

This application is a continuation of International Patent Application No. PCT/CN2022/093800, filed on May 19, 2022, which claims priority to Chinese Patent Application No. 202110653044.4, filed on Jun. 11, 2021. The disclosures of the aforementioned applications are hereby incorporated by reference in their entireties.

TECHNICAL FIELD

Embodiments of this application relate to the field of communication technologies, and in particular, to a polar encoding method and apparatus and a polar decoding method and apparatus.

BACKGROUND

Channel coding, as a most fundamental wireless access technology, plays a vital role in ensuring reliable data transmission. Polar codes are selected as a control channel coding scheme in a fifth generation (5G) standard. The polar codes are an existing known channel coding scheme that can be strictly proved to "reach" a channel capacity, and have features such as high performance and low complexity.

Although the polar codes are initially proposed as channel coding, research shows that the polar codes also have performance that can reach a theoretical boundary when being used for source coding.

How to apply the polar codes in source coding and decoding is a problem that needs to be considered.

SUMMARY

Embodiments of this application provide a polar encoding method and apparatus and a polar decoding method and apparatus, to apply polar codes to source coding and decoding, to improve source coding and decoding performance.

According to a first aspect, a polar encoding method is provided. The method may be performed by an encoding apparatus, or may be performed by a component (for example, a processor, a chip, a circuit, or a chip system) of the encoding apparatus. The encoding apparatus may be a terminal device, or may be a network device. The method may be implemented by using the following steps: obtaining to-be-encoded source bits; performing first polar encoding on the to-be-encoded source bits to obtain encoded source bits, where the first polar encoding includes first transformation and second transformation, the first transformation is polarization transformation, a mother code length corresponding to the first transformation is Ns, the polarization transformation is performed on the to-be-encoded source bits to obtain first source bits, and the second transformation is performed on the first source bits to obtain the encoded source bits; determining assistance information based on the first source bits; and outputting a source coding codeword, where the source coding codeword includes the encoded source bits and the assistance information. Information based on original source bits is added to a source coding result, so that source decoding can be assisted, thereby improving performance of source polar codes.

In some embodiments, the second transformation includes one or more of the following operations: a convolution operation, an upper triangular transformation operation, a compression operation, or an interleaving operation. The convolution operation may cause an additional association between polarized bits to some extent. Compared with a method in which no convolution operation is performed, in this method, more original information can be retained at a same compression rate, and a lower decoding error rate can be achieved. The upper triangular transformation operation may cause an additional association between polarized bits to some extent. Compared with a method in which no upper triangular transformation operation is performed, in this method, more original information can be retained at a same compression rate, and a lower decoding error rate can be achieved.

In some embodiments, the determining assistance information based on the first source bits may be implemented in the following manner: performing check coding on the first source bits to obtain check bits, where the check bits are the assistance information. The check bits are included in an encoding result, so that a correct decoding result can be obtained through screening by using the check bits during decoding, thereby helping improve performance of source polar codes. Especially in a scenario with a limited code length, short code performance of the source polar codes can be improved.

In some embodiments, the determining assistance information based on the first source bits may be implemented in the following manner: performing first decoding on the encoded source bits to obtain at least one candidate decoding result; determining a first decoding result that is in the at least one candidate decoding result and that matches the first source bits; and determining that indication information of the first decoding result is the assistance information. Optionally, the performing first decoding on the encoded source bits to obtain at least one candidate decoding result may be implemented in the following manner: performing first decoding on the encoded source bits to obtain L candidate vectors, where L is a positive integer. The determining a first decoding result that is in the at least one candidate decoding result and that matches the first source bits may be implemented in the following manner: comparing the L candidate vectors with the first source bits; and determining a first vector in the L candidate vectors that is the same as the first source bits, where information about a sequence number of the first vector in the L candidate vectors is the indication information. In this way, decoding may be performed once based on an encoding result during encoding, to determine whether the encoding is successful. In addition, the assistance information is generated based on a correct result indicating successful encoding, and the assistance information is in the source coding codeword. In this way, a decoding result indicated by the assistance information may be output during source decoding, thereby helping improve performance of the source polar codes. Especially in a scenario with a limited code length, short code performance of the source polar codes can be improved. Compared with a decoding method without assistance information, in this method, a size of a decoding list required to achieve a same bit error rate can be greatly reduced, that is, decoding complexity can be greatly reduced.

In some embodiments, the method further includes: performing second polar encoding on the source coding codeword to obtain a channel coding codeword, where a mother code length corresponding to the second polar encoding is Nc; and outputting the channel coding codeword. Joint source-channel coding is strictly superior to separate source-channel coding under a finite code length.

In some embodiments, m bits in the source coding codeword are flag bits, and m is a positive integer; and the performing second polar encoding on the source coding codeword may be implemented in the following manner: mapping, according to a mapping rule, the source coding codeword to information subchannels of a polarization subchannel of the second polar encoding, to obtain to-be-encoded channel bits, where the mapping rule includes interleaving mapping, and the interleaving mapping is: sequentially mapping the source coding codeword to the information subchannels in a natural order to obtain a channel information bit sequence; and exchanging a bit mapped to an information subchannel whose sequence number is $x_i$ and a bit mapped to an information subchannel whose sequence number is $x_j$, to obtain the to-be-encoded channel bits, where $x_i$ is a sequence number, in the channel information bit sequence, of an information subchannel to which an $i^{th}$ flag bit in the m flag bits is mapped, and $x_j$ is a sequence number, in the channel information bit sequence, of an information subchannel with lowest reliability in information subchannels whose sequence number range is $[x_i, x_{i+1})$, where $x_{i+1}$ is a sequence number, in the channel information bit sequence, of an information subchannel to which an $(i+1)^{th}$ flag bit in the m flag bits is mapped, both i and j are positive integers, and i=1, 2, . . . , m; and performing second polar encoding on to-be-coded channel bits. In this way, when an information bit with low reliability is encountered during channel decoding, soft information of a source bit with high reliability can be used to provide additional assistance for the channel decoding, and finally better decoding performance can be implemented.

In some embodiments, reliability of the m flag bits is higher than reliability of other bits except the m flag bits in the encoded source bits.

According to a second aspect, a polar decoding method is provided. The method may be performed by a decoding apparatus, or may be performed by a component (for example, a processor, a chip, a circuit, or a chip system) of the decoding apparatus. The decoding apparatus may be a terminal device, or may be a network device. The method may be implemented by using the following steps: obtaining to-be-decoded source information, where the to-be-decoded source information includes assistance information; performing first decoding on the to-be-decoded source information to obtain L candidate vectors, where L is a positive integer; determining a first vector in the L candidate vectors based on assistance information, where the assistance information is check bits or indication information, and the indication information indicates a sequence number of the first vector in the L candidate vectors; performing polarization transformation on the first vector to obtain a source decoding result; and outputting the source decoding result. Source decoding is performed by using the assistance information, so that decoding performance of source polar codes can be improved.

In some embodiments, the assistance information is check bits; and the determining a first vector in the L candidate vectors based on assistance information may be implemented in the following manner: sequentially checking, based on the check bits, the L candidate vectors in descending order of reliability; and when the check succeeds, determining a candidate vector on which the check succeeds as the first vector. When source decoding is performed, decoding is performed based on the check bits obtained by an encoder through encoding, so that a correct decoding result can be obtained through screening by using the check bits during decoding, thereby helping improve performance of source polar codes. Especially in a scenario with a limited code length, short code performance of the source polar codes can be improved.

In some embodiments, the assistance information is indication information, and the indication information indicates a sequence number of the first vector in the L candidate vectors; and the determining a first vector in the L candidate vectors based on assistance information may be implemented in the following manner: determining, based on the indication information, the first vector corresponding to the sequence number indicated by the indication information in the L candidate vectors. In this way, decoding may be performed once based on an encoding result during encoding, to determine whether the encoding is successful. In addition, the assistance information is generated based on a correct result indicating successful encoding, and the assistance information is in the source coding codeword. In this way, a decoding result indicated by the assistance information may be output during source decoding, thereby helping improve performance of the source polar codes. Especially in a scenario with a limited code length, short code performance of the source polar codes can be improved. Compared with a decoding method without assistance information, in this method, a size of a decoding list required to achieve a same bit error rate can be greatly reduced, that is, decoding complexity can be greatly reduced.

In some embodiments, the obtaining to-be-decoded source information may be implemented in the following manner: performing second decoding on to-be-decoded channel information to obtain a channel decoding result, where the channel decoding result includes L1 to-be-decoded candidate source vectors in descending order of reliability, and the to-be-decoded source information is one of the L1 to-be-decoded candidate source vectors. Joint source-channel decoding is superior to separate source-channel decoding in performance under a finite code length.

According to a third aspect, a polar decoding method is provided. The method may be performed by a decoding apparatus, or may be performed by a component (for example, a processor, a chip, a circuit, or a chip system) of the decoding apparatus. The decoding apparatus may be a terminal device, or may be a network device. The method may be implemented by using the following steps: obtaining to-be-decoded channel information; and performing second decoding on the to-be-decoded channel information to obtain a channel decoding result, where a path metric value corresponding to an $n1^{th}$ channel information bit is determined based on the following information: a path metric value corresponding to an $(n1-1)^{th}$ channel information bit, a path metric increment corresponding to the $n1^{th}$ channel information bit, and a metric value corresponding to an $n2^{th}$ source fixed bit obtained when first decoding is performed on the to-be-decoded source information to obtain the $n2^{th}$ source fixed bit, where n1 and n2 are both positive integers. In a channel decoding process, when some bits are decoded, source decoding is performed on the some bits based on a channel decoding result of the some bits, and a value of the source decoding of the some bits is fed back to channel decoding of a next bit. In this way, soft information of the source decoding can assist decoding of channel information bits.

In some embodiments, the metric value of the $n2^{th}$ source fixed bit obtained by performing first decoding on the to-be-decoded source information may be implemented in the following manner: a path metric value that corresponds to the 1st to the $n2^{th}$ source fixed bits and that is obtained when first decoding is performed on the to-be-decoded source information to obtain the $n2^{th}$ source fixed bit.

In some embodiments, the metric value of the $n2^{th}$ source fixed bit obtained by performing first decoding on the to-be-decoded source information may be implemented in the following manner: a path metric increment corresponding to the $n2^{th}$ source fixed bit obtained when first decoding is performed on the to-be-decoded source information to obtain the $n2^{th}$ source fixed bit.

In some embodiments, an information subchannel on which the $n1^{th}$ channel information bit is located has a mapping relationship with the $n2^{th}$ source fixed bit in the to-be-decoded source information.

In some embodiments, the mapping relationship is interleaving mapping, and the interleaving mapping is: sequentially mapping encoded source bits to information subchannels in a natural order to obtain a channel information bit sequence, where m bits in the encoded source bits are flag bits, and m is a positive integer; and exchanging a bit mapped to an information subchannel whose sequence number is $x_i$ and a bit mapped to an information subchannel whose sequence number is $x_j$, to obtain to-be-encoded channel bits, where $x_i$ is a sequence number, in the channel information bit sequence, of an information subchannel to which an $i^{th}$ flag bit in the m flag bits is mapped, and $x_j$ is a sequence number, in the channel information bit sequence, of an information subchannel with lowest reliability in information subchannels whose sequence number range is $[x_i, x_{i+1})$, where $x_{i+1}$ is a sequence number, in the channel information bit sequence, of an information subchannel to which an $(i+1)^{th}$ flag bit in the m flag bits is mapped, both i and j are positive integers, and i=1, 2, . . . , m. In this way, when an information bit with low reliability is encountered during channel decoding, soft information of a source bit with high reliability can be used to provide additional assistance for the channel decoding, and finally better decoding performance can be implemented.

In some embodiments, the path metric value corresponding to the $n1^{th}$ channel information bit is a sum of the following three: the path metric value corresponding to the $(n1-1)^{th}$ channel information bit, the path metric increment corresponding to the $n1^{th}$ channel information bit, and the metric value corresponding to the $n2^{th}$ source fixed bit obtained when second decoding is performed on to-be-decoded source information to obtain the $n2^{th}$ source fixed bit.

In some embodiments, information about the 1st to an $(n2-1)^{th}$ source fixed bits in the to-be-decoded source information is determined based on information about the $1^{st}$ to the $(n1-1)^{th}$ channel information bits; and a metric value of the $n2^{th}$ source fixed bit is determined based on the information about the $1^{st}$ to the $(n2-1)^{th}$ source fixed bits in the to-be-decoded source information.

In some embodiments, the to-be-decoded source information is determined based on the channel decoding result; first decoding is performed on the to-be-decoded source information to obtain L candidate vectors, where L is a positive integer; a first vector in the L candidate vectors is determined based on assistance information, where the assistance information is check bits or indication information, and the indication information indicates a sequence number of the first vector in the L candidate vectors; polarization transformation is performed on the first vector to obtain a source decoding result; and the source decoding result is output.

According to the foregoing several possible embodiments, information about source bits can be used to assist channel decoding. In this way, channel decoding is more accurate, and a more accurate source decoding result can be obtained by performing source decoding based on an obtained channel decoding result, thereby improving decoding performance.

In some embodiments, the assistance information is check bits; and the determining a first vector in the L candidate vectors based on assistance information includes: sequentially checking, based on the check bits, the L candidate vectors in descending order of reliability; and when the check succeeds, determining the first vector on which the check succeeds. When source decoding is performed, decoding is performed based on the check bits obtained by an encoder through encoding, so that a correct decoding result can be obtained through screening by using the check bits during decoding, thereby helping improve performance of source polar codes. Especially in a scenario with a limited code length, short code performance of the source polar codes can be improved.

In some embodiments, the assistance information is indication information, and the indication information indicates a sequence number of the first vector in the L candidate vectors; and the determining a first vector in the L candidate vectors based on assistance information includes: determining, based on the indication information, the first vector corresponding to the sequence number indicated by the indication information in the L candidate vectors. In this way, decoding may be performed once based on an encoding result during encoding, to determine whether the encoding is successful. In addition, the assistance information is generated based on a correct result indicating successful encoding, and the assistance information is in the source coding codeword. In this way, a decoding result indicated by the assistance information may be output during source decoding, thereby helping improve performance of the source polar codes. Especially in a scenario with a limited code length, short code performance of the source polar codes can be improved. Compared with a decoding method without assistance information, in this method, a size of a decoding list required to achieve a same bit error rate can be greatly reduced, that is, decoding complexity can be greatly reduced.

According to a fourth aspect, a polar encoding apparatus is provided. The apparatus has a function of implementing the method according to any one of the first aspect or the embodiments of the first aspect. The function may be implemented by hardware, or may be implemented by hardware executing corresponding software. The hardware or the software includes one or more modules corresponding to the foregoing function. In some embodiments, the apparatus may include a processing module and an input/output module. For example, the processing module is configured to: obtain to-be-encoded source bits; perform first polar encoding on the to-be-encoded source bits to obtain encoded source bits, where the first polar encoding includes first transformation and second transformation, the first transformation is polarization transformation, a mother code length corresponding to the first transformation is Ns, the polarization transformation is performed on the to-be-encoded source bits to obtain first source bits, and the second transformation is performed on the first source bits to obtain the encoded source bits; and determine assistance information based on the first source bits. The input/output module is configured to output a source coding codeword, where the source coding codeword includes the encoded source bits and the assistance information.

In some embodiments, the second transformation includes one or more of the following operations: a convolution operation, an upper triangular transformation operation, a compression operation, or an interleaving operation.

In some embodiments, when determining the assistance information based on the first source bits, the processing module is configured to: perform check coding on the first source bits to obtain check bits, where the check bits are the assistance information.

In some embodiments, when determining the assistance information based on the first source bits, the processing module is configured to: perform first decoding on the encoded source bits to obtain at least one candidate decoding result; determine a first decoding result that is in the at least one candidate decoding result and that matches the first source bits; and determine that indication information of the first decoding result is the assistance information.

In some embodiments, when performing first decoding on the encoded source bits to obtain the at least one candidate decoding result, the processing module is configured to perform first decoding on the encoded source bits to obtain L candidate vectors, where L is a positive integer. When determining the first decoding result that is in the at least one candidate decoding result and that matches the first source bits, the processing module is configured to: compare the L candidate vectors with the first source bits; and determine a first vector in the L candidate vectors that is the same as the first source bits, where information about a sequence number of the first vector in the L candidate vectors is the indication information.

In some embodiments, the processing module is further configured to: perform second polar encoding on the source coding codeword to obtain a channel coding codeword, where a mother code length corresponding to the second polar encoding is Nc; and the input/output module is further configured to output the channel coding codeword.

In some embodiments, m bits in the source coding codeword are flag bits, and m is a positive integer. When performing second polar encoding on the source coding codeword, the processing module is configured to: map, according to a mapping rule, the source coding codeword to information subchannels of a polarization subchannel of the second polar encoding, to obtain to-be-encoded channel bits, where the mapping rule includes interleaving mapping, and the interleaving mapping is: sequentially mapping the source coding codeword to the information subchannels in a natural order to obtain a channel information bit sequence; and exchanging a bit mapped to an information subchannel whose sequence number is $x_i$ and a bit mapped to an information subchannel whose sequence number is $x_j$, to obtain the to-be-encoded channel bits, where $x_i$ is a sequence number, in the channel information bit sequence, of an information subchannel to which an $i^{th}$ flag bit in the m flag bits is mapped, and $x_j$ is a sequence number, in the channel information bit sequence, of an information subchannel with lowest reliability in information subchannels whose sequence number range is $[x_i, x_{i+1})$, where $x_{i+1}$ is a sequence number, in the channel information bit sequence, of an information subchannel to which an $(i+1)^{th}$ flag bit in the m flag bits is mapped, both i and j are positive integers, and i=1, 2, . . . , m; and perform second polar encoding on to-be-coded channel bits.

In some embodiments, reliability of the m flag bits is higher than reliability of other bits except the m flag bits in the encoded source bits.

For beneficial effects of the fourth aspect and the possible embodiments, refer to descriptions of corresponding parts in the first aspect. Details are not described herein again.

According to a fifth aspect, a polar decoding apparatus is provided. The apparatus has a function of implementing the method according to any one of the second aspect or the embodiments of the second aspect. The function may be implemented by hardware, or may be implemented by hardware executing corresponding software. The hardware or the software includes one or more modules corresponding to the foregoing function. In some embodiments, the apparatus may include a processing module and an input/output module. For example, the processing module is configured to: obtain to-be-decoded source information, where the to-be-decoded source information includes assistance information; perform first decoding on the to-be-decoded source information to obtain L candidate vectors, where L is a positive integer; determine a first vector in the L candidate vectors based on assistance information, where the assistance information is check bits or indication information, and the indication information indicates a sequence number of the first vector in the L candidate vectors; and perform polarization transformation on the first vector to obtain a source decoding result. The input/output module is configured to output the source decoding result.

In some embodiments, the assistance information is check bits; and when determining the first vector in the L candidate vectors based on assistance information, the processing module is configured to: sequentially check, based on the check bits, the L candidate vectors in descending order of reliability; and when the check succeeds, determining a candidate vector on which the check succeeds as the first vector.

In some embodiments, the assistance information is indication information, and the indication information indicates a sequence number of the first vector in the L candidate vectors; and when determining the first vector in the L candidate vectors based on the assistance information, the processing module is configured to: determine, based on the indication information, the first vector corresponding to the sequence number indicated by the indication information in the L candidate vectors.

In some embodiments, when obtaining the to-be-decoded source information, the processing module is configured to: perform second decoding on to-be-decoded channel information to obtain a channel decoding result, where the channel decoding result includes L1 to-be-decoded candidate source vectors in descending order of reliability, and the to-be-decoded source information is one of the L1 to-be-decoded candidate source vectors.

For beneficial effects of the fifth aspect and the possible embodiments, refer to descriptions of corresponding parts in the second aspect. Details are not described herein again.

According to a sixth aspect, a polar decoding apparatus is provided. The apparatus has a function of implementing the method according to any one of the third aspect or the embodiments of the third aspect. The function may be implemented by hardware, or may be implemented by hardware executing corresponding software. The hardware or the software includes one or more modules corresponding to the foregoing function. In some embodiments, the apparatus may include a processing module and an input/output module. For example, the input/output module is configured to obtain to-be-decoded channel information. The processing module is configured to perform second decoding on the to-be-decoded channel information to obtain a channel decoding result, where a path metric value corresponding to an $n1^{th}$ channel information bit is determined based on the following information: a path metric value corresponding to an $(n1-1)^{th}$ channel information bit, a path metric increment corresponding to the $n1^{th}$ channel information bit, and a metric value corresponding to an $n2^{th}$ source fixed bit obtained when first decoding is performed on the to-be-decoded source information to obtain the $n2^{th}$ source fixed bit, where n1 and n2 are both positive integers.

In some embodiments, when the metric value of the $n2^{th}$ source fixed bit is obtained by performing first decoding on the to-be-decoded source information, the processing module is configured to obtain a path metric value corresponding to the $1^{st}$ to the $n2^{th}$ source fixed bits when first decoding is performed on the to-be-decoded source information to obtain the $n2^{th}$ source fixed bit.

In some embodiments, when the metric value of the $n2^{th}$ source fixed bit is obtained by performing first decoding on the to-be-decoded source information, the processing module is configured to obtain a path metric increment corresponding to the $n2^{th}$ source fixed bit when first decoding is performed on the to-be-decoded source information to obtain the $n2^{th}$ source fixed bit.

In some embodiments, an information subchannel on which the $n1^{th}$ channel information bit is located has a mapping relationship with the $n2^{th}$ source fixed bit in the to-be-decoded source information.

In some embodiments, the mapping relationship is interleaving mapping, and the interleaving mapping is: sequentially mapping encoded source bits to information subchannels in a natural order to obtain a channel information bit sequence, where m bits in the encoded source bits are flag bits, and m is a positive integer; and exchanging a bit mapped to an information subchannel whose sequence number is $x_i$ and a bit mapped to an information subchannel whose sequence number is $x_j$, to obtain to-be-encoded channel bits, where $x_i$ is a sequence number, in the channel information bit sequence, of an information subchannel to which an $i^{th}$ flag bit in the m flag bits is mapped, and $x_j$ is a sequence number, in the channel information bit sequence, of an information subchannel with lowest reliability in information subchannels whose sequence number range is $[x_i, x_{i+1})$, where $x_{i+1}$ is a sequence number, in the channel information bit sequence, of an information subchannel to which an $(i+1)^{th}$ flag bit in the m flag bits is mapped, both i and j are positive integers, and i=1, 2, . . . , m.

In some embodiments, the path metric value corresponding to the $n1^{th}$ channel information bit is a sum of the following three: the path metric value corresponding to the $(n1-1)^{th}$ channel information bit, the path metric increment corresponding to the $n1^{th}$ channel information bit, and the metric value corresponding to the $n2^{th}$ source fixed bit obtained when second decoding is performed on to-be-decoded source information to obtain the $n2^{th}$ source fixed bit.

In some embodiments, the processing module is further configured to: determine the to-be-decoded source information based on the channel decoding result; perform first decoding on the to-be-decoded source information to obtain L candidate vectors, where L is a positive integer; determine a first vector in the L candidate vectors based on assistance information, where the assistance information is check bits or indication information, and the indication information indicates a sequence number of the first vector in the L candidate vectors; and perform polarization transformation on the first vector to obtain a source decoding result; and output the source decoding result.

For beneficial effects of the sixth aspect and the possible embodiments, refer to descriptions of corresponding parts in the third aspect. Details are not described herein again.

According to a seventh aspect, some embodiments of this application provide a polar encoding apparatus, where the apparatus includes a memory and a processor. The memory is configured to store a program, instructions, or code. The processor is configured to invoke the program, the instructions, or the code stored in the memory, to perform the method according to the first aspect or the embodiments of the first aspect. The apparatus may further include an input/output interface, configured to communicate with another apparatus. The memory may be a physically independent unit, or may be coupled to the processor, or the processor includes the memory.

According to an eighth aspect, some embodiments of this application provide a polar decoding apparatus. The apparatus includes a memory and a processor. The memory is configured to store a program, instructions, or code. The processor is configured to invoke the program, the instructions, or the code stored in the memory, to perform the method according to the second aspect, the third aspect, the embodiments of the second aspect, or the embodiments of the third aspect. The apparatus may further include an input/output interface, configured to communicate with another apparatus. The memory may be a physically independent unit, or may be coupled to the processor, or the processor includes the memory.

According to a ninth aspect, some embodiments of this application provide a polar encoding apparatus. The apparatus has a function of implementing the method according to any one of the first aspect or the embodiments of the first aspect. The function may be implemented by hardware, or may be implemented by hardware executing corresponding software. The hardware or the software includes one or more modules corresponding to the foregoing function. In a possible design, the apparatus includes: an input/output interface circuit, configured to obtain to-be-encoded source bits; a logic circuit, configured to perform behavior in any one of the first aspect or the embodiments of the first aspect; and an input/output interface circuit, configured to output a source coding codeword, where the source coding codeword includes encoded source bits and assistance information.

Optionally, the polar encoding apparatus may be a chip or an integrated circuit.

According to a tenth aspect, some embodiments of this application provide a decoding apparatus. The apparatus has a function of implementing the method according to any one of the second aspect or the embodiments of the second aspect. The function may be implemented by hardware, or may be implemented by hardware executing corresponding software. The hardware or the software includes one or more modules corresponding to the foregoing function. In some embodiments, the apparatus includes: an input/output interface circuit, configured to obtain to-be-decoded source information, where the to-be-decoded source information includes assistance information; a logic circuit, configured to perform behavior in any one of the second aspect or the embodiments of the second aspect; and an input/output interface circuit, configured to output a source decoding result.

Optionally, the decoding apparatus may be a chip or an integrated circuit.

According to an eleventh aspect, some embodiments of this application provide a polar encoding apparatus. The apparatus has a function of implementing the method according to any one of the first aspect or the embodiments of the first aspect. The function may be implemented by hardware, or may be implemented by hardware executing corresponding software. The hardware or the software includes one or more modules corresponding to the foregoing function. In a possible design, the apparatus includes: an input/output interface circuit, configured to obtain to-be-decoded channel information; and a logic circuit, configured to perform behavior in any one of the third aspect or the embodiments of the third aspect.

Optionally, the polar encoding apparatus may be a chip or an integrated circuit.

According to a twelfth aspect, some embodiments of this application provide a computer-readable storage medium. The computer-readable storage medium stores computer-readable instructions. When the computer-readable instructions are run on a computer, the method according to the first aspect or the embodiments of the first aspect is performed.

According to a thirteenth aspect, some embodiments of this application provide a computer-readable storage medium. The computer-readable storage medium stores computer-readable instructions. When the computer-readable instructions are run on a computer, the method according to the second aspect or the embodiments of the second aspect is performed, or the method according to the third aspect or the embodiments of the third aspect is performed.

According to a fourteenth aspect, some embodiments of this application provide a chip system. The chip system includes a processor, and may further include a memory. The memory is configured to store a program, instructions, or code. The processor is configured to invoke the program, the instructions, or the code stored in the memory, to perform the method according to the first aspect or the embodiments of the first aspect. The chip system may include a chip, or may include a chip and another discrete component.

According to a fifteenth aspect, some embodiments of this application provide a chip system. The chip system includes a processor, and may further include a memory. The memory is configured to store a program, instructions, or code. The processor is configured to invoke the program, the instructions, or the code stored in the memory, to implement the method according to the second aspect or the embodiments of the second aspect, or to implement the method according to the third aspect or the embodiments of the third aspect. The chip system may include a chip, or may include a chip and another discrete component.

According to a sixteenth aspect, a computer program product including instructions is provided. When the computer program product runs on a computer, the method according to the first aspect or the embodiments of the first aspect is performed.

According to a seventeenth aspect, a computer program product including instructions is provided. When the computer program product runs on a computer, the method according to the second aspect or the embodiments of the second aspect is performed, or the method according to the third aspect or the embodiments of the third aspect is performed.

DESCRIPTION OF EMBODIMENTS

Embodiments of this application provide a polar encoding method and apparatus and a polar decoding method and apparatus. The methods and the apparatuses are based on a same inventive concept. Because problem-resolving principles of the methods and the apparatuses are similar, mutual reference may be made to implementations of the apparatuses and the methods. Repeated parts are not necessarily described again.

In descriptions of embodiments of this application, the term "and/or" describes an association relationship between associated objects and indicates that three relationships may exist. For example, A and/or B may indicate the following three cases: Only A exists, both A and B exist, and only B exists. A plurality of in this application means two or more. In addition, it should be understood that in description of this application, terms such as "first" and "second" are merely used for distinguishing and description, but should not be understood as indicating or implying relative importance, or should not be understood as indicating or implying a sequence.

The following describes in detail embodiments of this application with reference to accompanying drawings.

The polar encoding method and the polar decoding method provided in embodiments of this application may be applied to a 5G communication system, for example, a 5G new radio (NR) system, or may be applied to various future evolved communication systems, for example, a $6^{th}$ generation (6G) communication system or a space-air-sea-ground integrated communication system.

Figure 1A:
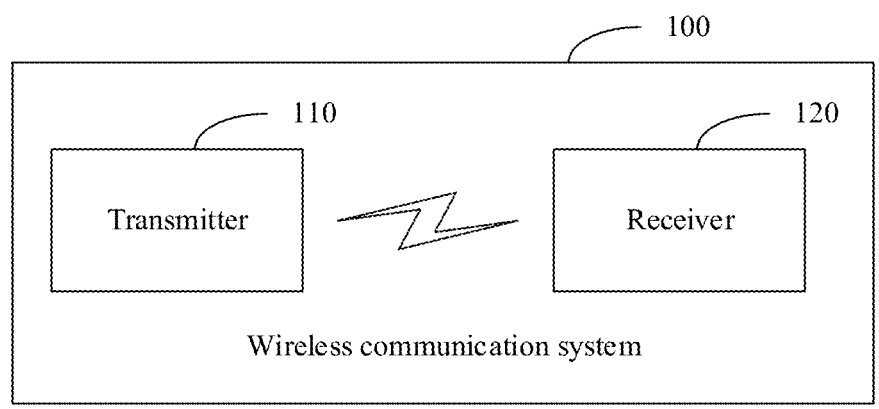
FIG. 1a is a schematic diagram 1 of an architecture of a communication system according to some embodiments of this application.
Figure 1B:
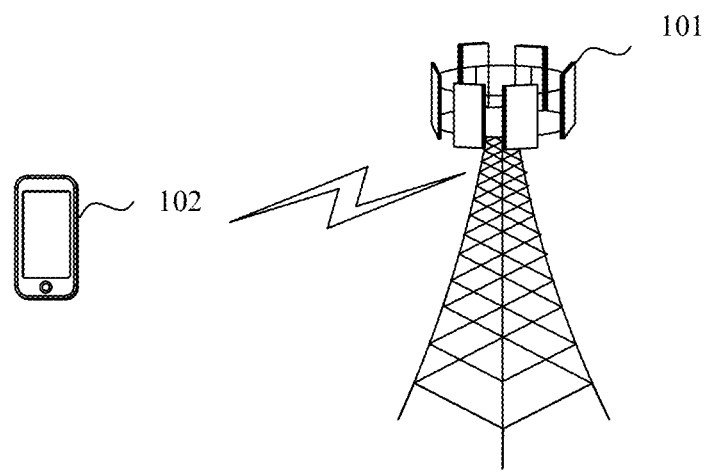
FIG. 1b is a schematic diagram 2 of an architecture of a communication system according to some embodiments of this application.

FIG. 1a shows an architecture of a wireless communication system to which the polar encoding method and the polar decoding method provided in embodiments of this application may be applied. The wireless communication system 100 includes a transmitter 110 and a receiver 120. The transmitter 110 may be a network device, and the receiver 120 is a terminal device; or the transmitter 110 is a terminal device, and the receiver 120 is a network device. When the wireless communication system includes a network device and a terminal device, the architecture of the wireless communication system may alternatively be shown in FIG. 1b, and includes a network device 101 and a terminal device 102.

The following describes possible implementations and functions of the network device 101 and the terminal device 102 by using examples.

The network device 101 provides a service for the terminal device 102 within a coverage area of the network device 101. Refer to FIG. 1a. For example, the network device 101 provides radio access for one or more terminal devices 102 within the coverage area of the network device 101.

The network device 101 is a node in a radio access network (RAN), and may also be referred to as a base station, or may be referred to as a RAN node (or device). Currently, some examples of the network device 101 are a next-generation NodeB (gNB), a next-generation evolved NodeB (Ng-eNB), a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), or a wireless fidelity (Wi-Fi) access point (AP). The network device 101 may alternatively be a satellite, and the satellite may also be referred to as a high-altitude platform, a high-altitude aircraft, or a satellite base station. Alternatively, the network device 101 may be another device that has a function of the network device. For example, the network device 101 may be alternatively a device that functions as a network device in device-to-device (D2D) communication, vehicle-to-everything, or machine-to-machine (M2M) communication. Alternatively, the network device 101 may be any possible network device in a future communication system.

The terminal device 102 is also be referred to as user equipment (UE), a mobile station (MS), a mobile terminal (MT), or the like, and is a device that provides a user with voice and/or data connectivity. For example, the terminal device 102 is a handheld device, a vehicle-mounted device, or the like that has a wireless connection function. Currently, the terminal device 102 may be a mobile phone, a tablet computer, a notebook computer, a palmtop computer, a mobile internet device (MID), a wearable device (for example, a smartwatch, a smart band, or a pedometer), a vehicle-mounted device (for example, a vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an uncrewed aerial vehicle, or an aircraft), or the like. Alternatively, the terminal device 102 may be another device that has a function of the terminal device. For example, the terminal device 102 may be alternatively a device that functions as a terminal device in D2D communication, vehicle-to-everything, or M2M communication. Particularly, when communication is performed between network devices, a network device that functions as a terminal device may also be considered as a terminal device.

To facilitate understanding of embodiments of this application, the following first explains and describes concepts or terms in this application, to facilitate understanding by persons skilled in the art.

(1) Polar Code

The polar code is also a linear block code, and a generator matrix is $G_N$. The generator matrix may also be denoted as G, and the generator matrix may also be referred to as an encoding matrix. An encoding process is $x_1^N = u_1^N G_N$, where $u = (u_1, u_2, \ldots, u_N)$ is a binary row vector, a length is N, N is a code length of the polar code, $G_N$ is an N×N matrix, and $G_N = F_2^{\otimes (log_2(N))}$. $F_2^{\otimes (log_2(N))}$ is defined as a Kronecker product of $log_2 N$ matrices $F_2$, where $$F_2 = \begin{bmatrix} 1 & 0 \\ 1 & 1 \end{bmatrix}.$$

(2) Polar Code Channel Coding

In a channel coding process of a polar code, some bits in $u_1^N$ are used to carry information, and the bits carrying the information are referred to as information bits. The bits for carrying the information form an information bit set, and a set of indexes of these bits is denoted as A. Other bits are set to fixed values pre-agreed on by a receiver and a transmitter, and are referred to as a set of fixed bits or a set of frozen bits. A set of indexes of the bits is represented by a complementary set $A^c$ of A. A polar encoding process is equivalent to $x_1^N = u_A G_N(A) \oplus u_{A^c} G_N(A^C)$. Herein, $G_N(A)$ is a submatrix obtained by using rows corresponding to indexes in a set A in $G_N$, and $G_N(AC)$ is a submatrix obtained by using rows corresponding to indexes in a set $A^c$ in $G_N$. $u_A$ is an information bit set in $u_1^N$, and a quantity of information bits is K. $u_{A^c}$ is a fixed bit set in $u_1^N$, and a quantity of fixed bits is (N−K), and the bits are known bits. These fixed bits are usually set to 0. However, the fixed bits may be set to any value provided that the value is agreed on by the receiver and the transmitter in advance. Therefore, encoding output of the polar code may be simplified as: $u_1^N = u_A G_N(A)$, where $u_A$ is the information bit set in $u_1^N$, $u_A$ is a row vector of a length K, that is, |A|=K, | | represents a quantity of elements in the set, K is an information block size, K is a quantity of information bits, or K is a size of the information bit set, $G_N(A)$ is a submatrix obtained by using rows corresponding to indexes in the set A in the matrix $G_N$, and $G_N(A)$ is a K×N matrix.

A construction process of the polar code is a selection process of the set A. This determines performance of the polar code. The construction process of the polar code is usually as follows: It is determined, based on a mother code length N, that there are N polarization channels in total, corresponding to N rows of a generator matrix respectively, to calculate reliability of the polarization channels. Indexes of first K polarization channels with high reliability are used as elements of the set A, and indexes corresponding to remaining (N−K) polarization channels are used as elements of the index set $A^c$ of the fixed bits. The set A determines locations of the information bits, and the set $A^c$ determines locations of the fixed bits.

(2) Polar Code Channel Decoding

Figure 2A:
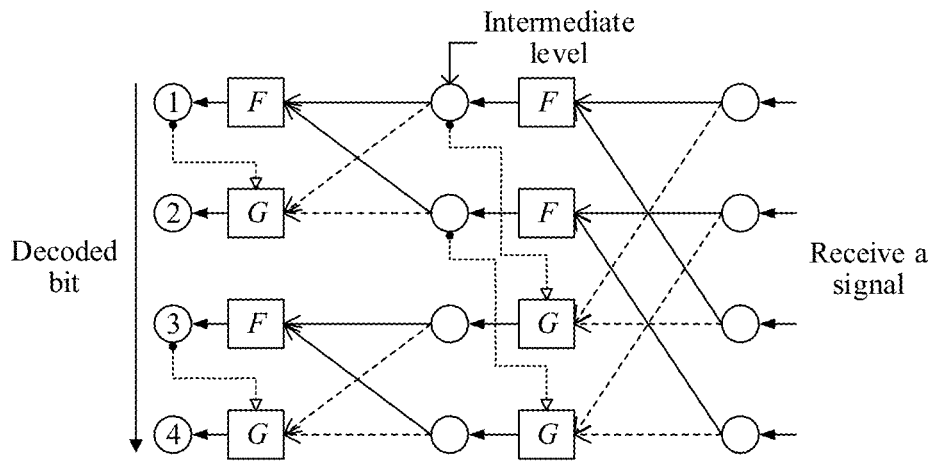
FIG. 2a is a schematic diagram of a successive-cancellation (SC) decoding calculation process according to some embodiments of this application.

An SC decoding method is an effective decoding algorithm for a polar code. After receiving a signal, a decoding device calculates a log-likelihood ratio (LLR) of the information bits one by one. If the LLR of the information bit is greater than 0, a decoding result is 0; if the LLR of the information bits is less than 0, a decoding result is 1. The fixed bits are set to 0 regardless of the LLR. FIG. 2a is a schematic diagram of an SC decoding calculation process. For example, there are four decoded bits. There are eight computing nodes in total in FIG. 2a, in which there are four F nodes and four G nodes, and the F node and the G node respectively correspond to an F function and a G function. Calculation for the F node requires two LLR inputs on a right side of the F node. Calculation for the G node requires two LLR inputs on a right side of the G node and an upper-stage output that is also used as an input. An output can be calculated only after input calculation is completed. According to the foregoing calculation rule, in FIG. 2a, starting from receiving a signal from the right side, calculation is sequentially performed for the eight nodes, the obtained decoded bits are successively $\hat{1} \to \hat{2} \to \hat{3} \to \hat{4}$, and decoding is completed.

Figure 2B:
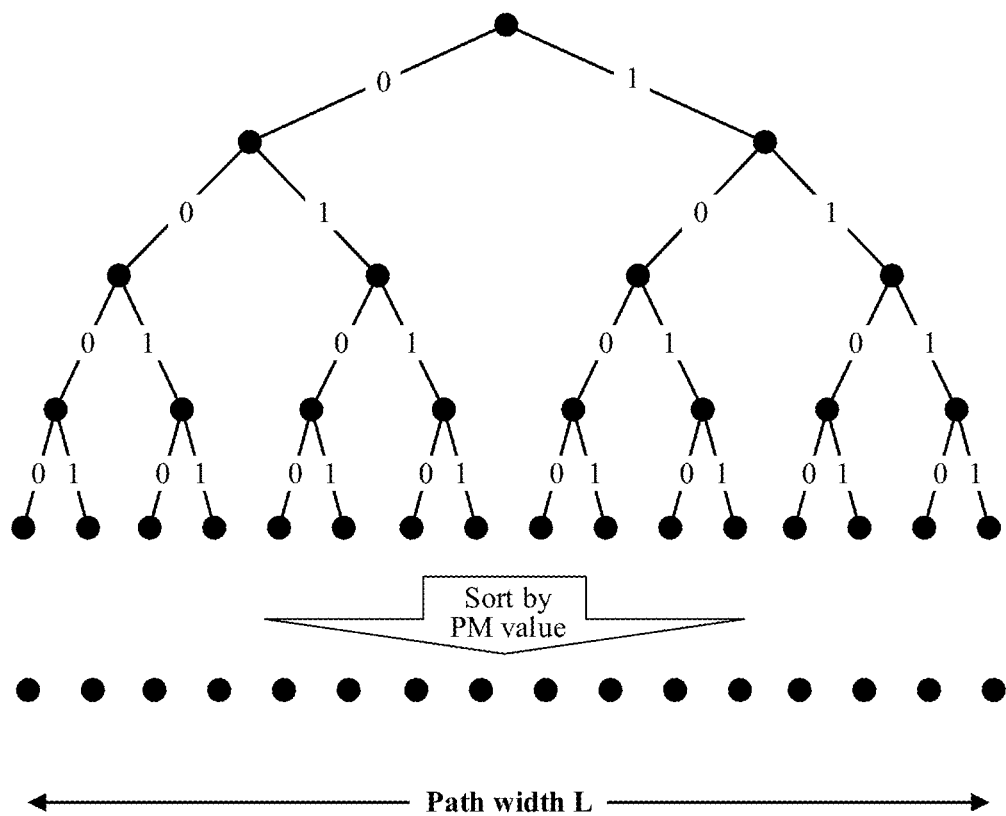
FIG. 2b is a schematic diagram of a decoding path in a successive-cancellation list (SCL) algorithm according to some embodiments of this application.

Performance of the SC decoding method is poor. A result of a previous decoded bit is used as an input for calculation of a next decoded bit. Once a judgment error occurs, the error spreads, and there is no opportunity to correct the error. Therefore, decoding performance is not high. To resolve this problem, in a SCL algorithm, when decoding each information bit, the SCL algorithm stores decoding results corresponding to 0 and 1 as two branch decoding paths (path splitting for short). FIG. 2b is a schematic diagram of a decoding path in the SCL algorithm. As shown in FIG. 2b, each layer represents one decoded bit. If a decoding result is 0, a path is developed along a left subtree. If a decoding result is 1, a path is developed along a right subtree. When a total quantity of decoding paths exceeds a preset path width L (generally, L is an integer power of 2), L paths with optimal path metric (PM) values are selected for storage, and the paths continue to be developed to obtain subsequent decoded bits through decoding. The PM values are for determining whether the paths are good or bad, and the PM values are obtained through calculation by using the LLR. For a decoded bit at each level, the PM values of the L paths are sorted in ascending order, and a correct path is selected by using the PM values. This process is repeated until the last bit is decoded.

(3) Source Polar Code

Figure 3:
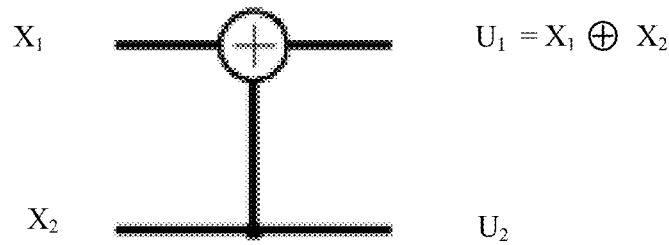
FIG. 3 is a schematic diagram 1 of polar code source polarization according to some embodiments of this application.

An example in which two source bits are polarized is used to describe how binary source entropy is polarized. As shown in FIG. 3, it is assumed that $X_1$ and $X_2$ are two independent Ber(q) sources. Ber(q) refers to the Bernoulli distribution with a distribution probability of q. A source entropy of $X_1$ and $X_2$ is $H(x_1)=H(x_2)=H(q)=-q \log_2 q-(1-q) \log_2 (1-q)$. Relationships $u_1=x_1 \oplus x_2$ and $u_2=x_2$ are obtained by using a polarization matrix $$\begin{bmatrix} 1 & 0 \\ 1 & 1 \end{bmatrix}.$$

Because the polarization matrix is a reversible matrix, a sum of entropy obtained after the polarization operation shown in FIG. 3 remains unchanged. To be specific, $$H(x_1,x_2)=H(u_1,u_2)=H(u_1)+H(u_2|u_1).$$

In addition, because $u_2=x_2$, $H(u_2|u_1) \leq H(x_2)=H(x_1)$. Because the sum of entropy after the polarization operation remains unchanged, $H(u_1) \geq H(x_1)$. It can be learned that after the polarization operation, two independent and co-distributed Bernoulli sources become one signal source with a larger source entropy and one signal source with a smaller source entropy. This is the basic principle of source polarization.

If the foregoing process is repeated, and two independent and co-distributed sources (corresponding to entropy $H(u_1)$ and $H(u_2|u_1)$) are further polarized, the source entropy may be further polarized. In this case, a corresponding polarization matrix is $$G_N = \begin{bmatrix} 1 & 0 \\ 1 & 1 \end{bmatrix}^{\otimes n},$$

where ⊗ is a tensor operation (tensor product). The polarization process is obtained by $u_N = x_N \times G_N$.

$H(u_N) = \sum_{i=1}^N H(u_i|u_1^{i-1})$ is obtained based on a chain formula for entropy.

According to the source polarization theory, $H(u_i|u_1^{i-1})$ continues to be polarized with an increase of N, but there is a range $0 \leq H(u_i|u_1^{i-1}) \leq 1$. Therefore, in an extreme case $N \to \infty$, $H(u_i|u_1^{i-1})$ is polarized to 1 or 0. Because the total entropy is conserved, $H(u_N)=H(x_N)=NH(x)$.

A proportion of a part that is polarized to 1 may be obtained as H(x), that is, $$\lim_{N \to \infty} \frac{|i \in [N]: H(u_i|u_1^{i-1})=1|}{N} = H(x); \text{ and}$$

-continued $$\lim_{N\to\infty} \frac{|i \in [N]: H(u_i|u_1^{i-1}) = 0|}{N} = 1 - H(x).$$

In this way, compression of a signal $x_1^N$ may be converted into compression of $u_1^N$. Some bits in $u_1^N$ may be completely determined by other bits $u_1^{i-1}$, and do not need to be stored, and only a part of the other part $H(u_i|u_1^{i-1})=1$ needs to stored.

In conclusion, a first step of a source polar encoding process is polarization transformation, that is, $u_1^N = x_1^N G_N$, where $u_1^N = \{x_1, x_2, \ldots, x_N\}$ is a non-uniformly distributed binary source sequence whose length is N. According to a source polarization theory, as N increases, a part of a conditional entropy $H(u_i|u_1^{i-1})$ (i=1, 2, ..., N) tends to be 0 (that is, $u_i$ can be basically determined after $u_1^{i-1}$ is given), and the other part tends to be 1 (that is, $u_i$ cannot be determined after $u_1^{i-1}$ is given). According to this principle, $u_1^N$ is divided into two parts. One part is referred to as redundant bits (that is, bits whose conditional entropy is close to 0), and the other part is referred to as fixed bits. An index set of these bits is denoted as F. In embodiments of this application, in source coding and source decoding, the fixed bits may also be referred to as source fixed bits, and the redundant bits may also be referred to as source redundant bits. Source bits include source fixed bits and source redundant bits.

After the fixed bits are known, the redundant bits may be correctly recovered with a high probability. A second step of the source polar encoding process is to delete a redundant bit. Therefore, the entire source polar encoding process may be simplified as $u_F = x_1^N G_N[F]$, where $G_N[F]$ is a submatrix including columns corresponding to indexes in a set F in $G_N$.

Based on coupling between the source coding and the channel coding, source polar decoding is basically the same as channel polar decoding. All channel log-likelihood ratios $$\ln \frac{P(y_i|x_i = 0)}{P(y_i|x_i = 1)} (i = 1, 2, \ldots, N)$$

input to channel polar code decoders are set to $$\ln \frac{P(0)}{1 - P(0)},$$

where P(0) is a probability that a source bit is 0, and the channel polar code decoder may be directly for performing source polar decoding.

When a conventional source polar encoding scheme is used, performance is not good when SC decoding is used in a scenario with a limited code length. Performance is improved to some extent when SCL decoding is used, but is still not ideal. On one hand, path metrics of some candidate results in a decoding list are completely the same. On the other hand, there may not be a highest probability to have a correct decoding result.

This application provides a polar encoding method, to improve performance of source polar codes.

Figure 4:
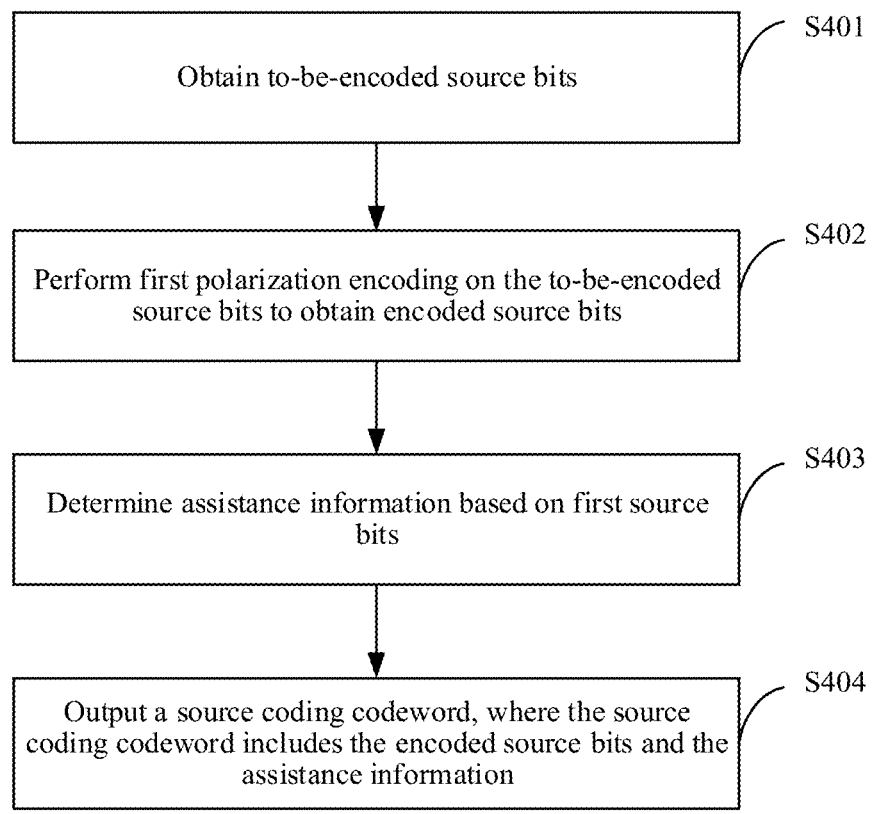
FIG. 4 is a schematic flowchart of a polar encoding method according to some embodiments of this application.

As shown in FIG. 4, a procedure of a polar encoding method is described as follows: The method is performed by a transmitter or an encoder, and the transmitter or the encoder may be a terminal device, or may be a network device. The transmitter performs polar encoding according to the following method, and may send an output source coding codeword to a receiver. Alternatively, the encoder performs polar encoding according to the following method, and may send an output source coding codeword to a decoder. If the transmitter or the encoder is a terminal device, the receiver or the decoder may be a network device. If the transmitter or the encoder is a network device, the receiver or the decoder may be a terminal device.

S401. Obtain to-be-encoded source bits.

S402. Perform first polar encoding on the to-be-encoded source bits to obtain encoded source bits.

The first polar encoding includes first transformation and second transformation, the first transformation is polarization transformation, a mother code length corresponding to the first transformation is Ns, the polarization transformation is performed on the to-be-encoded source bits to obtain first source bits, and the second transformation is performed on the first source bits to obtain the encoded source bits. Ns may be an integer power of 2.

S403. Determine assistance information based on the first source bits.

S404. Output a source coding codeword, where the source coding codeword includes the encoded source bits and the assistance information.

The encoded source bits and the assistance information may be combined to obtain the source coding codeword. For example, the assistance information is spliced after the encoded source bits, or the encoded source bits are spliced after the assistance information, or the assistance information is inserted in a preset position between the encoded source bits.

Information based on original source bits is added to a source coding result, so that source decoding can be assisted, thereby improving performance of source polar codes.

Figure 5:
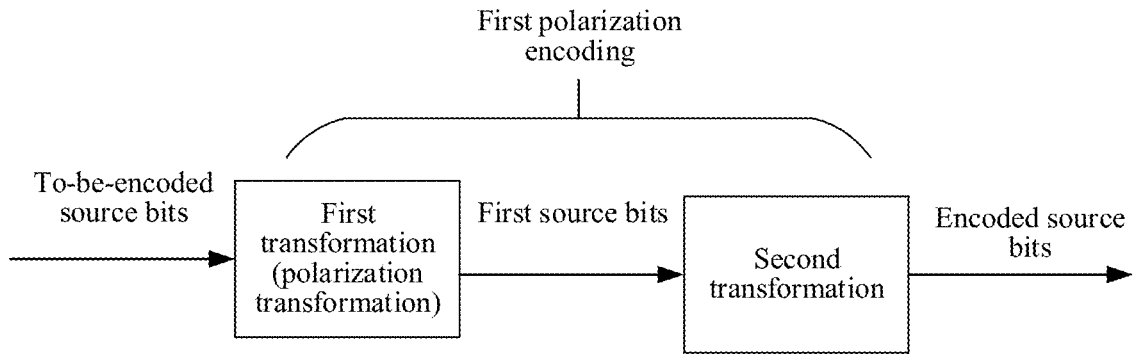
FIG. 5 is a schematic diagram 1 of a polar encoding process according to some embodiments of this application.

FIG. 5 is a schematic diagram of the foregoing polar encoding process.

The second transformation includes one or more of the following operations: a convolution operation, an upper triangular transformation operation, a compression operation, or an interleaving operation.

For example, the second transformation may be a compression operation. The first source bits are obtained after polarization transformation is performed on the to-be-encoded source bits; the first source bits are compressed, that is, bits corresponding to a fixed bit set F in the first source bits are reserved, and redundant bits are deleted; and the encoded source bits are obtained.

For another example, the second transformation may be a convolution operation and a compression operation. The first source bits are obtained after polarization transformation is performed on the to-be-encoded source bits. After the convolution operation is performed on the first source bits, the compression operation is performed on the first source bits. The compression operation is: For bits obtained after the convolution operation is performed on the first source bits, bits corresponding to the fixed bit set F are reserved, and redundant bits are deleted; and the encoded source bits are obtained. The convolution operation may cause an additional association between polarized bits to some extent. Compared with a method in which no convolution operation is performed, in this method, more original information can be retained at a same compression rate, and a lower decoding error rate can be achieved. Based on the convolution operation, a relationship between source fixed bits and source information bits, and a value of each bit obtained after the convolution operation may change. For the operation of reserving the bits corresponding to the fixed bit set F, the bits corresponding to the fixed bit set F may be bits that are in the bits obtained after the convolution operation and that correspond to the source fixed bits in original F.

For another example, the second transformation may be an upper triangular transformation operation and a compression operation. The first source bits are obtained after polarization transformation is performed on the to-be-encoded source bits. After the upper triangular transformation operation is performed on the first source bits, the compression operation is performed on the first source bits. The compression operation is: For bits obtained after the upper triangular transformation operation is performed on the first source bits, bits corresponding to the fixed bit set F are reserved, and redundant bits are deleted; and the encoded source bits are obtained. The upper triangular transformation operation is to multiply the first source bits by an upper triangular matrix. The upper triangular transformation operation may cause an additional association between polarized bits to some extent. Compared with a method in which no upper triangular transformation operation is performed, in this method, more original information can be retained at a same compression rate, and a lower decoding error rate can be achieved.

The determining assistance information based on the first source bits may be implemented in the following manner:

Manner 1: The assistance information is check bits. Optionally, check coding is performed on the first source bits to obtain check bits, where the check bits are the assistance information. The output source coding codeword includes the encoded source bits and the check bits. The check bits are included in an encoding result, so that a correct decoding result can be obtained through screening by using the check bits during decoding, thereby helping improve performance of source polar codes. Especially in a scenario with a limited code length, short code performance of the source polar codes can be improved.

Manner 2: The assistance information is indication information, and the indication information indicates a candidate vector. For example, the indication information indicates a sequence number of a candidate vector. Optionally, first decoding may be performed on the encoded source bits to obtain at least one candidate decoding result, a first decoding result that is in the at least one candidate decoding result and that matches the first source bits is determined, and indication information of the first decoding result is determined as the assistance information.

For example, the first decoding is SCL decoding, and SCL decoding is performed on the encoded source bits to obtain L candidate vectors, where L is a positive integer, and L may be a decoding path width. The L candidate vectors are compared with the first source bits; and a first vector in the L candidate vectors that is the same as the first source bits is determined, where information about a sequence number of the first vector in the L candidate vectors is the indication information. The indication information may be a binary representation of a sequence number of a candidate vector.

In this way, decoding may be performed once based on an encoding result during encoding, to determine whether the encoding is successful. In addition, the assistance information is generated based on a correct result indicating successful encoding, and the assistance information is in the source coding codeword. In this way, a decoding result indicated by the assistance information may be output during source decoding, thereby helping improve performance of the source polar codes. Especially in a scenario with a limited code length, short code performance of the source polar codes can be improved. Compared with a decoding method without assistance information, in this method, a size of a decoding list required to achieve a same bit error rate can be greatly reduced, that is, decoding complexity can be greatly reduced.

The embodiment in FIG. 4 describes the polar encoding method. Some embodiments of this application further provide a polar decoding method, to improve performance of source polar codes. The polar decoding method is a separately protected solution in embodiments of this application, or may be combined based on the polar encoding scheme provided in FIG. 4, to form a solution that needs to be protected in embodiments of this application.

Figure 6:
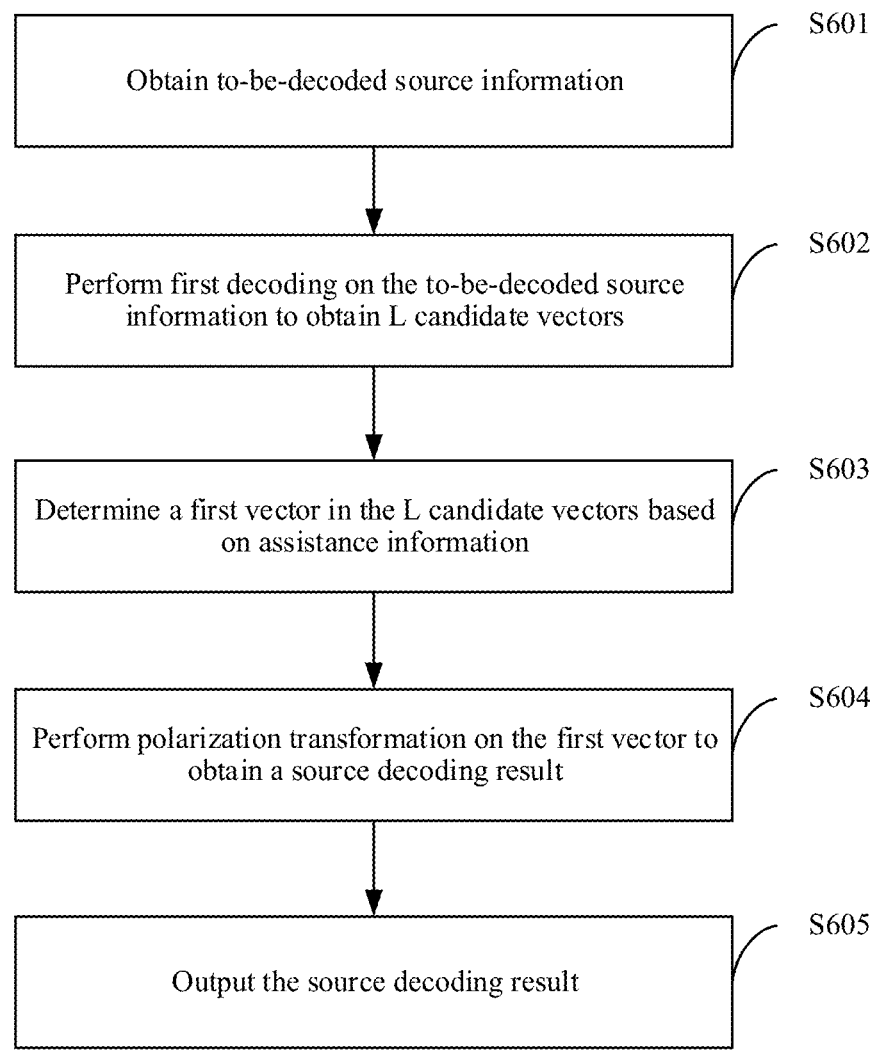
FIG. 6 is a schematic flowchart 1 of a polar decoding method according to some embodiments of this application.

As shown in FIG. 6, a procedure of a polar decoding method provided in some embodiments of this application is as follows: The method is performed by a receiver or a decoder, and the receiver or the decoder may be a terminal device or a network device. The receiver receives to-be-decoded source information from a transmitter, and performs polar decoding according to the following method. Alternatively, the decoder receives to-be-decoded source information from an encoder, and performs polar decoding according to the following method. If the receiver or the decoder is a terminal device, the transmitter or the encoder may be a network device. If the receiver or the decoder is a network device, the transmitter or the encoder may be a terminal device.

S601. Obtain to-be-decoded source information.

The to-be-decoded source information includes assistance information.

S602. Perform first decoding on the to-be-decoded source information to obtain L candidate vectors, where L is a positive integer.

The first decoding may be SCL decoding or other decoding, for example, list decoding of polarization-adjusted convolutional (PAC) codes. L is a decoding path width L, and L may be an integer power of 2.

S603. Determine a first vector in the L candidate vectors based on the assistance information.

S604. Perform polarization transformation on the first vector to obtain a source decoding result.

S605. Output the source decoding result.

Source decoding is performed by using the assistance information, so that decoding performance of source polar codes can be improved.

The following describes some optional implementations of the embodiment in FIG. 6.

The following describes some possible implementations of the assistance information.

Manner a: The assistance information is check bits. Optionally, the L candidate vectors may be sequentially checked based on the check bits and in an order of weight values; and when the check succeeds, a candidate vector on which the check succeeds is determined as the first vector. For example, first decoding is performed on the to-be-decoded source information to obtain the L candidate vectors. The L candidate vectors each have a weight value, and the weight values of the L candidate vectors may determine an order of the L candidate vectors, for example, in descending order of the weight values, or in ascending order of the weight values. For example, the weight is a PM value, and the candidate vectors may be sequentially checked based on the check bits and in an order of PM values of the L candidate vectors. For example, one candidate vector is sequentially selected in descending order of absolute values of the PM values of the L candidate vectors, and the candidate vector is checked based on the check bits. If the check succeeds, the vector on which the check succeeds is the first vector. If the check fails, a next selected candidate vector continues to be checked based on the check bits. If the check succeeds, the vector on which the check succeeds is the first vector. In this way, the first vector is selected.

The manner a may be combined with the manner 1 in the foregoing source polar encoding scheme. The encoder performs check coding on the first source bits to obtain check bits, where the check bits are the assistance information. The output source coding codeword includes the encoded source bits and the check bits. When performing source decoding, the decoder performs decoding based on the check bits obtained by the encoder through encoding, so that a correct decoding result can be obtained through screening by using the check bits during decoding, thereby helping improve performance of source polar codes. Especially in a scenario with a limited code length, short code performance of the source polar codes can be improved.

Manner b: The assistance information is indication information, and the indication information indicates a candidate vector. For example, the indication information indicates a sequence number of a candidate vector. Optionally, the first vector corresponding to the sequence number indicated by the indication information in the L candidate vectors is determined based on the indication information. The indication information herein may indicate one of the L candidate vectors. For example, the indication information may indicate a sequence number of the first vector, and the indication information may be a binary representation of the sequence number of the first vector. Assuming that L=32, and the indication information is a binary representation of 2, the decoder may determine, based on the binary representation of 2, the first vector corresponding to the sequence number 2.

The manner b may be combined with the manner 2 in the foregoing source polar encoding scheme. In this case, the encoder performs SCL decoding on the encoded source bits to obtain L candidate vectors. The L candidate vectors are compared with the first source bits; and a first vector in the L candidate vectors that is the same as the first source bits is determined, where information about a sequence number of the first vector in the L candidate vectors is the indication information. The decoder may determine, based on the indication information, the first vector corresponding to the sequence number indicated by the indication information in the L candidate vectors. In this way, decoding may be performed once based on an encoding result during encoding, to determine whether the encoding is successful. In addition, the assistance information is generated based on a correct result indicating successful encoding, and the assistance information is in the source coding codeword. In this way, a decoding result indicated by the assistance information may be output during source decoding, thereby helping improve performance of the source polar codes. Especially in a scenario with a limited code length, short code performance of the source polar codes can be improved. Compared with a decoding method without assistance information, in this method, a size of a decoding list required to achieve a same bit error rate can be greatly reduced, that is, decoding complexity can be greatly reduced.

The polar decoding method is described above. Based on a same technical concept, in the first decoding, SC decoding is performed on the to-be-decoded source information based on SC decoding, to obtain a vector. The assistance information is the check bits, and a vector is checked based on the assistance information (that is, based on the check bits). If the check on the vector succeeds, a polarization transformation is performed on the vector, to obtain a source decoding result. If the vector check fails, a previous procedure of the source decoding is returned to, for example, channel decoding is returned to, and a next result of the channel decoding is selected according to a channel decoding rule, to perform source decoding. The source decoding is to repeat the foregoing process: performing SC decoding on to-be-decoded source information to obtain a vector, and checking the vector based on the check bits; and if the check succeeds, performing polarization transformation on the vector to obtain a source decoding result.

Based on the polar encoding method in the embodiment in FIG. 4 and the polar decoding method shown in FIG. 6, the following further provides descriptions in detail with reference to an application scenario. In the following embodiments in an application scenario, an encoding method and a decoding method are combined for description. It may be understood that the encoding method and the decoding method may also be used independently.

Application Scenario 1

Figure 7A:
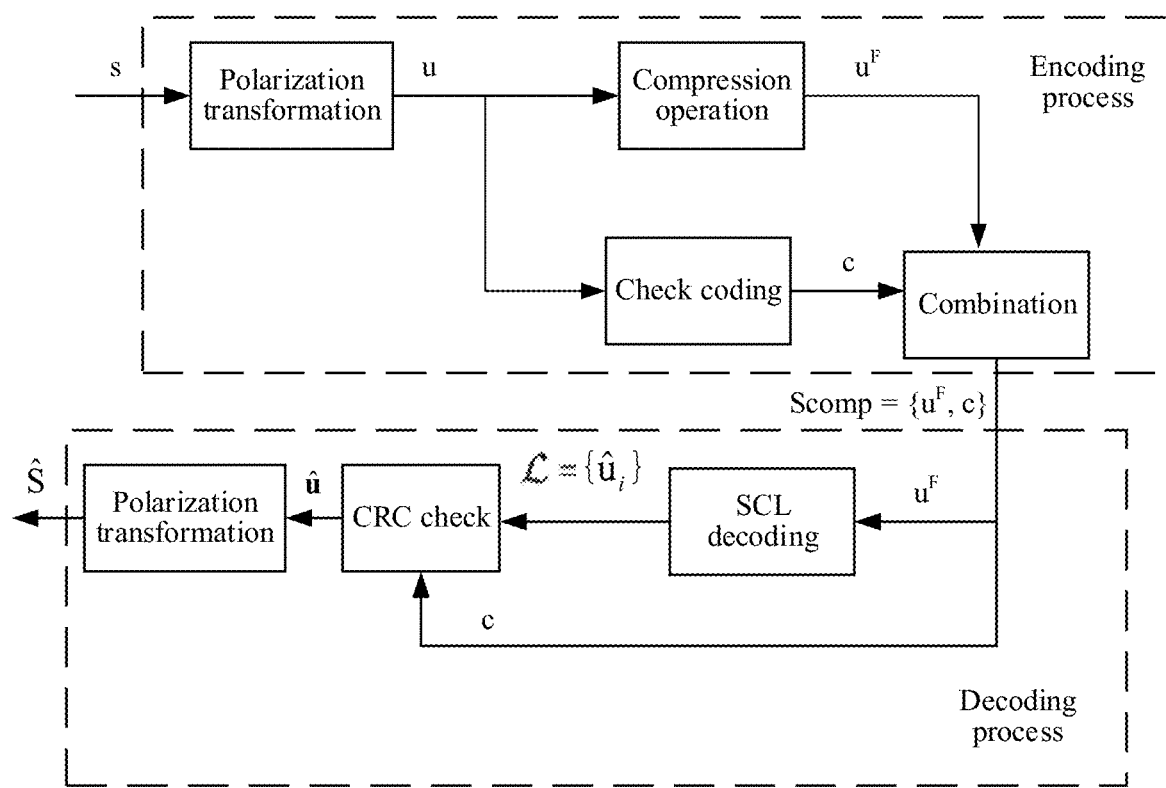
FIG. 7a is a schematic diagram of a process of an encoding/decoding method in an application scenario 1 according to some embodiments of this application.

It is assumed that the assistance information is check bits, and the second transformation is a compression operation. A schematic diagram of a process of the encoding/decoding method is shown in FIG. 7a. A process may be described as follows:

Encoding process: Polarization transformation is performed on to-be-encoded source bits s to obtain u; a compression operation is performed on u, that is, bits $u^F$ corresponding to a fixed bit set F in u are reserved, and redundant bits are deleted; check coding is performed on u to generate check bits c, for example, CRC coding may be performed on u to generate CRC check bits c; and $u^F$ and the check bits c are combined to obtain a source coding codeword $s_{comp}$.

Decoding process: Source SCL decoding with a list size of L is performed based on $u^F$, to obtain a candidate decoding result list L={$\hat{u}_i$}, i=1, 2, . . . , L.

A CRC check is sequentially performed on candidate results in L in descending order of reliability or probabilities. If a check on a specific $\hat{u}_i$ succeeds, the check is stopped and $\hat{u}=\hat{u}_i$ is output; if a check on all elements fails, $\hat{u}=\hat{u}_1$ is output.

Polarization transformation is performed on $\hat{u}$ to obtain a source decoding result $\hat{s}$.

Application Scenario 2

Figure 7B:
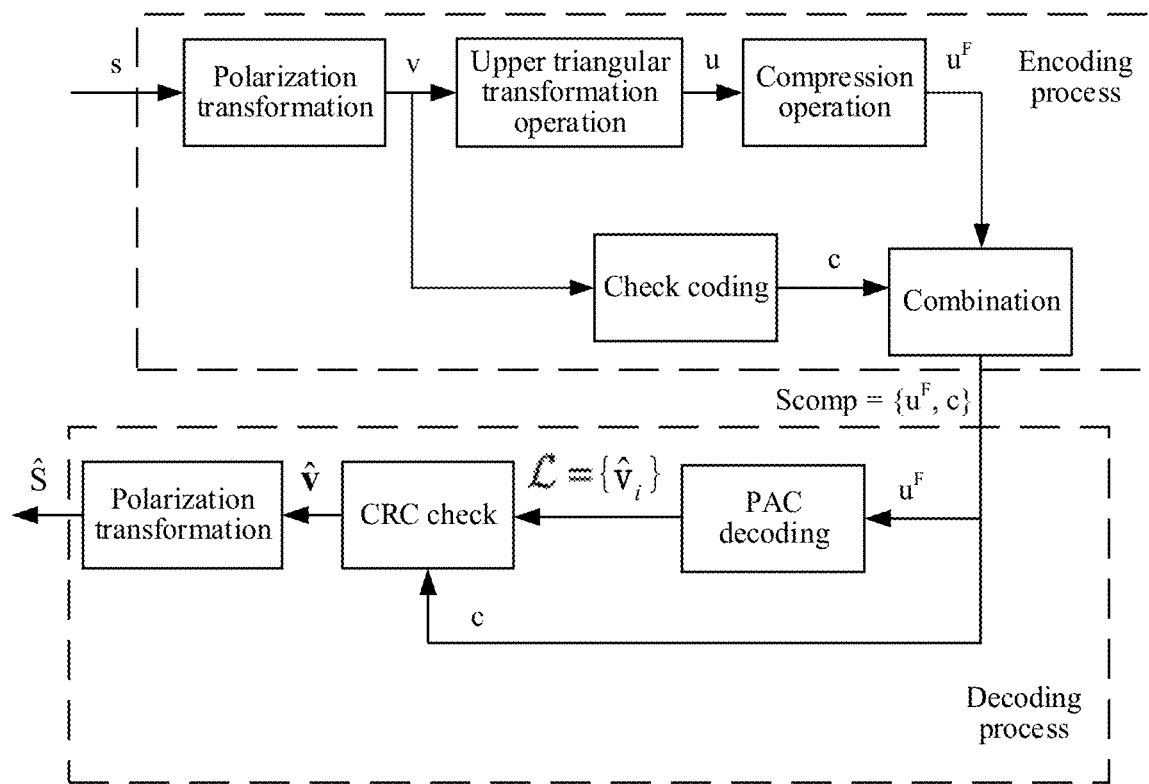
FIG. 7b is a schematic diagram of a process of an encoding/decoding method in an application scenario 2 according to some embodiments of this application.

It is assumed that the assistance information is check bits, and the second transformation is a convolution operation (or an upper triangular transformation operation) and a compression operation. A schematic diagram of a process of the encoding/decoding method is shown in FIG. 7b. A process may be described as follows:

Encoding process: Polarization transformation is performed on to-be-encoded source bits s to obtain v; a compression operation (or an upper triangular transformation operation) is performed on v once, to obtain $u^F$ bits u corresponding to a fixed bit set F in u are reserved, and redundant bits are deleted; CRC coding is performed on u to generate CRC check bits c; and $u^F$ and the check bits c are combined to obtain a source coding codeword $s_{comp}$.

Decoding process: Source decoding with a list size of L is performed based on $u^F$, where source decoding may be performed by using a list decoder for PAC codes, to obtain a candidate decoding result list L={$\hat{u}_i$}, i=1, 2, ..., L.

A CRC check is sequentially performed on candidate results in L, in descending order of reliability. If a check on a specific $\hat{u}_i$ succeeds, the check is stopped and $\hat{u}=\hat{u}_i$ is output; if check on all elements fails, $\hat{u}=\hat{u}_1$ is output.

Polarization transformation is performed on $\hat{u}$ to obtain a source decoding result $\hat{s}$.

In some embodiments of this application, if the second transformation includes a convolution operation or an upper triangular transformation operation, a list decoder for PAC codes may be used during decoding. The list decoder for the PAC codes is similar to an SCL decoder for polar codes, but impact of convolution needs to be considered in a decoding process.

Application Scenario 3

Figure 7C:
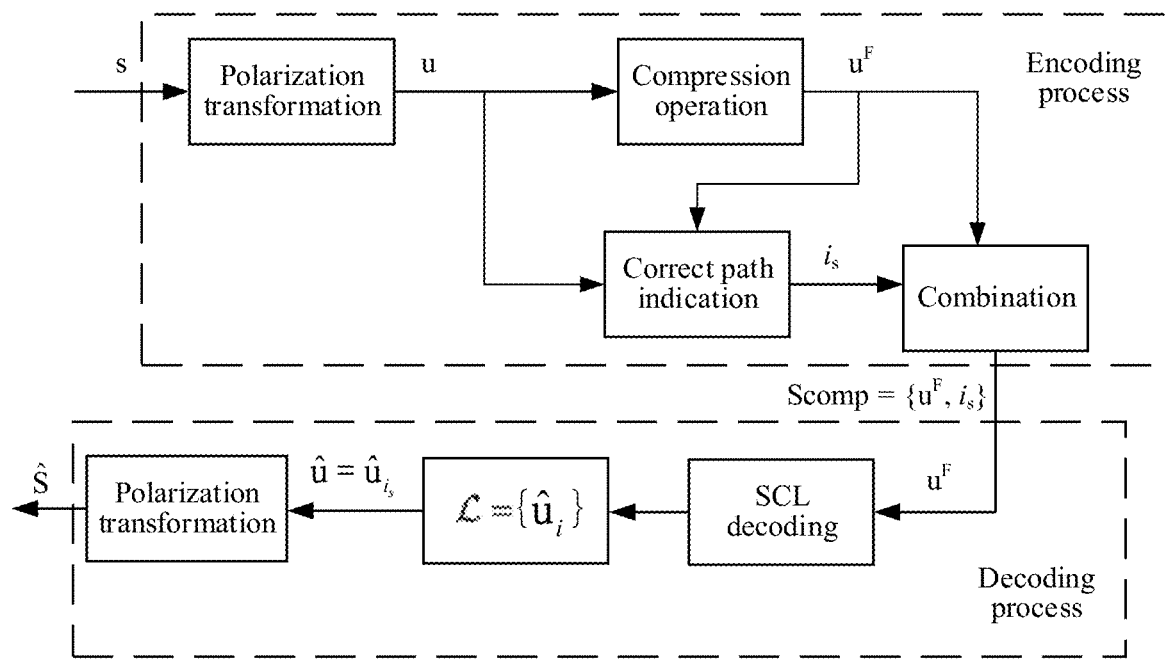
FIG. 7c is a schematic diagram of a process of an encoding/decoding method in an application scenario 3 according to some embodiments of this application.

It is assumed that the assistance information is indication information, and the second transformation is a compression operation. A schematic diagram of a process of the encoding/decoding method is shown in FIG. 7c. A process may be described as follows:

Encoding process: Polarization transformation is performed on to-be-encoded source bits s to obtain u; bits corresponding to a fixed bit set F in u are reserved, and redundant bits are deleted; list decoding with a list size of L is performed by using $u^F$, to obtain a candidate result list, where the candidate result list includes L candidate vectors; and the L candidate vectors are compared with the first source bits $u^F$, to determine a first vector that is in the L candidate vectors and that is the same as the first source bits $u^F$. The first vector is a correct path, and a binary representation is of the first vector is put into an encoding result. $i_s$ is a binary representation of one of sequence numbers 1 to L, and a value of $i_s$ is log 2(L) bits. If no vector that is the same as the first source bits $u^F$ exists in the L candidate vectors, it is known that the encoding fails. In this case, it may be assumed that $i_s$=0. $u^F$ and $i_s$ are combined into $s_{comp}$ to obtain the source coding codeword. Optionally, when the encoding fails, L may increase to continue to perform encoding until encoding succeeds. Because log 2(L) bits are required to represent 1 to L by using binary numbers, when this policy is used, the solution may become a lossless variable-length code solution.

Decoding Process:

Source SCL decoding whose list size is L is performed based on $u^F$, to obtain a candidate decoding result list L={$\hat{u}_i$}, i=1, 2, ..., L.

$\hat{u}=\hat{u}_{i_s}$ is output.

Polarization transformation is performed on $\hat{u}$ to obtain a source decoding result $\hat{s}$.

Application Scenario 4

Figure 7D:
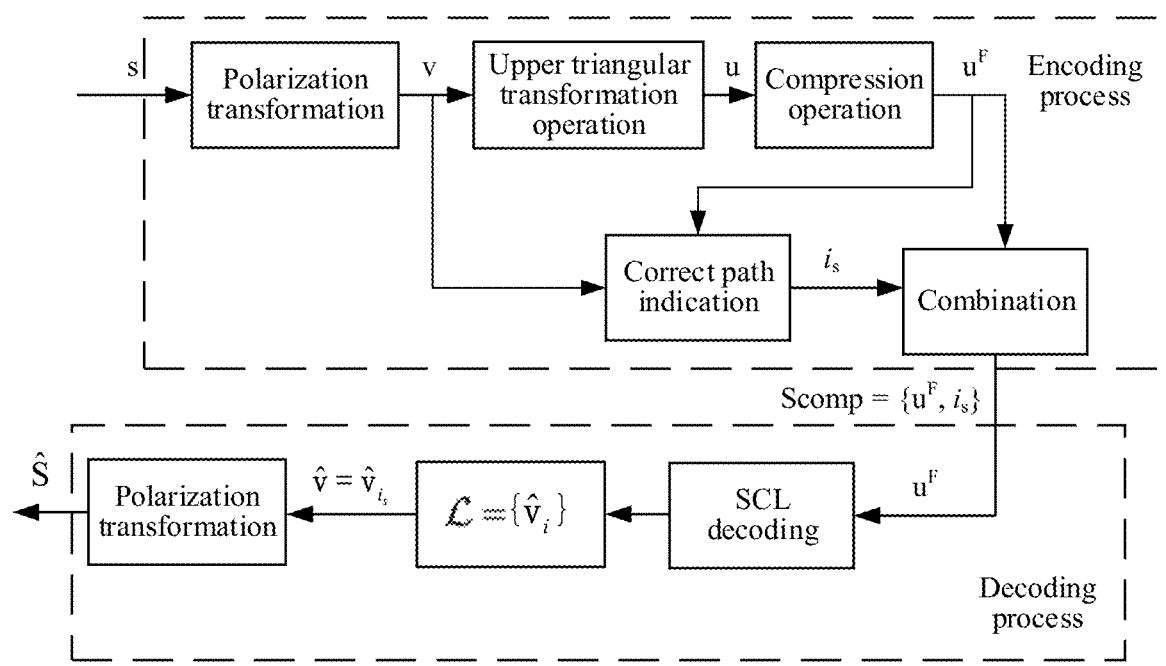
FIG. 7d is a schematic diagram of a process of an encoding/decoding method in an application scenario 4 according to some embodiments of this application.

It is assumed that the assistance information is indication information, and the second transformation is a convolution operation (or an upper triangular transformation operation) and a compression operation. A schematic diagram of a process of the encoding/decoding method is shown in FIG. 7d. The process may be described as follows:

Encoding process: Polarization transformation is performed on to-be-encoded source bits s to obtain v; a convolution operation (or an upper triangular transformation operation) is performed on v once to obtain u; bits corresponding to a fixed bit set F in u are reserved, and redundant bits are deleted; list decoding with a list size of L is performed by using $u^F$, to obtain a candidate result list, where the candidate result list includes L candidate vectors; and the L candidate vectors are compared with the first source bits $u^F$, to determine a first vector that is in the L candidate vectors and that is the same as the first source bits $u^F$. The first vector is a correct path, and a binary representation is of the first vector is put into an encoding result. $i_s$ is a binary representation of one of sequence numbers 1 to L, and a value of $i_s$ is log 2(L) bits. If no vector that is the same as the first source bits $u^F$ exists in the L candidate vectors, it is known that the encoding fails. In this case, it may be assumed that $i_s$=0. $u^F$ and $i_s$ are combined into $s_{comp}$ to obtain the source coding codeword. Optionally, when the encoding fails, L may increase to continue to perform encoding until encoding succeeds. Because log 2(L) bits are required to represent 1 to L by using binary numbers, when this policy is used, the solution may become a lossless variable-length code solution.

Decoding Process:

List decoding with a list size of L is performed, on PAC codes, based on $u^F$, to obtain a candidate decoding result list L={$\hat{u}_i$}, i=1, 2, ..., L.

$\hat{u}=\hat{u}_{i_s}$ is output.

Polarization transformation is performed on $\hat{u}$ to obtain a source decoding result $\hat{s}$.

A source in an information theory, a source given in a channel coding theorem, and a limiting rate in channel coding, all require for a code length to be infinite. In a case of a limited code length, neither of them can reach their respective limit rate. A shorter code length indicates that a rate reached is far from a theoretical limit. Therefore, the separated source coding and channel coding are optimal only when the code length is very long. In an application, a code length for communication is usually limited due to factors such as complexity and a delay. In this case, even if original information is compressed through source coding, some residual redundancy still exists. A channel decoder uses this part of source redundancy to assist decoding, and a decoding error probability of a system can be greatly reduced. Therefore, joint source-channel coding is strictly superior to separate source-channel coding under a finite code length.

The following describes another polar encoding method provided in some embodiments of this application. The method is a joint source-channel coding method. The method may be combined with the source coding method provided in the foregoing embodiment, and a channel coding method may be added on this basis.

Figure 8:
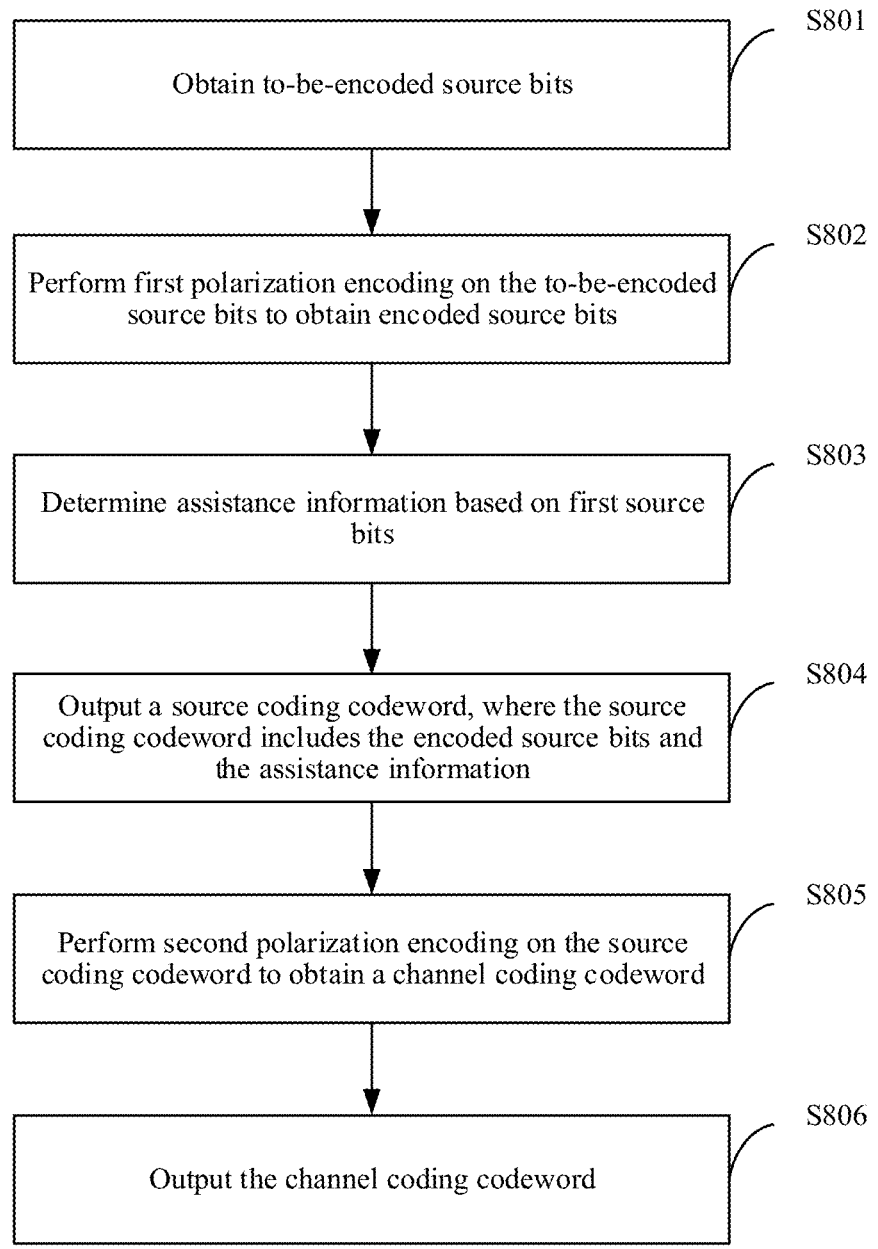
FIG. 8 is a schematic diagram 2 of polar code source polarization according to some embodiments of this application.

As shown in FIG. 8, a procedure of the polar encoding method is as follows:

S801 to S804 are the same as S401 to S404.

S805. Perform second polar encoding on the source coding codeword to obtain a channel coding codeword.

A mother code length corresponding to the second polar encoding is Nc, and Nc may be an integer power of 2. The second polar encoding may be polar channel coding.

S806. Output the channel coding codeword.

As described in the foregoing description of (2) about polar channel coding, during polar channel coding, the first K polarization channels with high reliability are locations of to-be-coded bits, and remaining locations are locations of fixed bits. The polarization channel may also be referred to as a polarized subchannel, a mother code length is Nc, and first K polarized subchannels with high reliability in the Nc polarized subchannels may be referred to as information subchannels. In the embodiment in FIG. 8, the to-be-encoded bits include the source coding codeword, and the source coding codeword is mapped to information subchannels. Optionally, check coding may be performed on the source coding codeword to obtain a check coding codeword. For example, CRC coding is performed on the source coding codeword to obtain a CRC check coding codeword. The to-be-encoded bits include a source coding codeword and the check coding codeword, and the source coding codeword and the check coding codeword are mapped to information subchannels.

After mapping is implemented, to-be-coded channel bits are obtained; and then second polar encoding is performed on the to-be-coded channel bits to obtain the foregoing channel coding codeword, and the channel coding codeword is output.

The following provides an optional implementation of mapping the source coding codeword to the information subchannels. It may be understood that, when check coding is performed on the source coding codeword, the source coding codeword and the check coding codeword need to be mapped to the information subchannels. For the descriptions of a mapping manner, in this specification, that no check coding is performed on the source coding codeword is used as an example, that is, the source coding codeword is mapped to the information subchannels. The described method may be applied to a scenario in which the source coding codeword and the check coding codeword are mapped to the information subchannels.

Mapping Rule A:

The mapping rule A is natural mapping. The source coding codeword is sequentially mapped to the information subchannels in a natural order to obtain the to-be-encoded channel bits.

Mapping Rule B:

The mapping rule B is interleaving mapping.

The source coding codeword is mapped to the information subchannels according to the mapping rule B, to obtain the to-be-encoded channel bits. The source coding codeword includes m flag bits. Reliability of the m flag bits is higher than reliability of other bits in the source coding codeword. The flag bit may also have another name. This is not limited in this application.

During source coding, an encoder may mark the m flag bits for reference in an interleaving mapping process of channel coding. Due to a limited code length, some of polarized source bits have a reliability (that is, conditional entropy is small and close to 0), but are insufficient to be deleted. These bits may be for providing additional soft information for channel decoding. When a source code is constructed, m fixed bits with high reliability (that is, low conditional entropy) are marked as flag bits.

The interleaving mapping is: first, sequentially mapping the source coding codeword to information subchannels in a natural order to obtain a channel information bit sequence; and exchanging a bit mapped to an information subchannel whose sequence number is $x_i$ and a bit mapped to an information subchannel whose sequence number is $x_j$, to obtain to-be-encoded channel bits, where $x_i$ is a sequence number, in the channel information bit sequence, of an information subchannel to which an $i^{th}$ flag bit in the m flag bits is mapped, and $x_j$ is a sequence number, in the channel information bit sequence, of an information subchannel with lowest reliability in information subchannels whose sequence number range is $[x_i, x_{i+1})$, where $x_{i+1}$ is a sequence number, in the channel information bit sequence, of an information subchannel to which an $(i+1)^{th}$ flag bit in the m flag bits is mapped, both i and j are positive integers, and i=1, 2, . . . , m.

Figure 9:
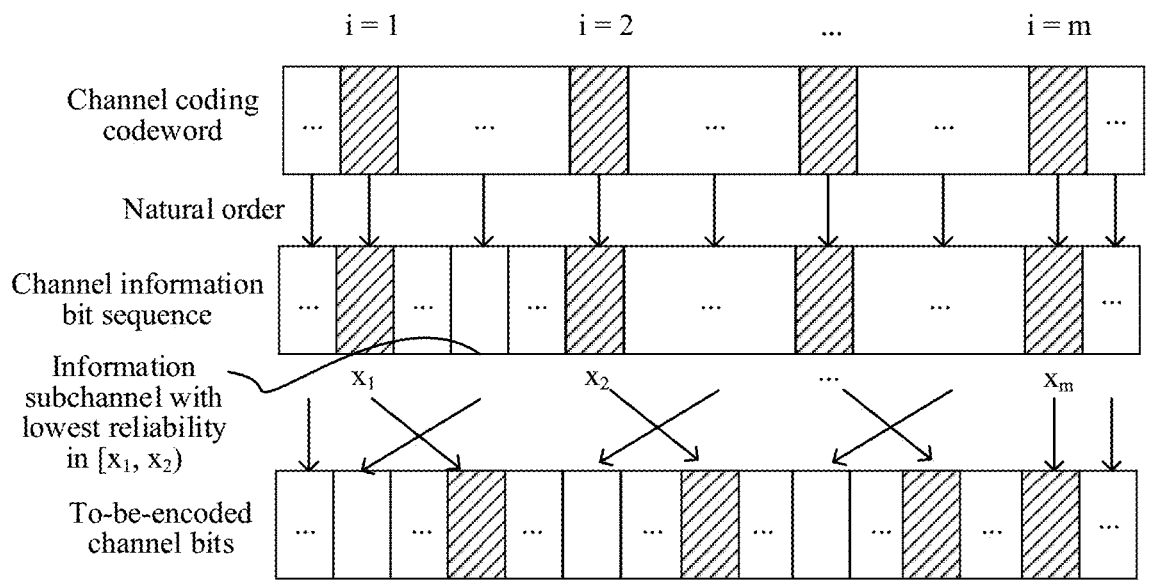
FIG. 9 is a schematic diagram of interleaving mapping according to some embodiments of this application.

The first K polarized subchannels with high reliability in the Nc polarized subchannels are information subchannels, that is, a quantity of the information subchannels is K. As shown in FIG. 9, a source coding codeword includes m flag bits, and sequence numbers of the m flag bits are represented by i, where i=1, 2, . . . , m. The flag bit is represented by a shadow. The source coding codeword is mapped to the information subchannels in a natural order to obtain the channel information bit sequence. The mapping in the natural order is: The $1^{st}$ bit of the source coding codeword is mapped to the $1^{st}$ information subchannel, the $2^{nd}$ bit of the source coding codeword is mapped to the second information subchannel, and so on, a Kth bit of the source coding codeword is mapped to a Kth information subchannel.

After the source coding codeword is mapped to the information subchannels in sequence in the natural order, the m flag bits are correspondingly mapped to the m information subchannels. A sequence number of an information subchannel to which an $i^{th}$ flag bit in the m flag bits is mapped is $x_i$ in the channel information bit sequence, and a sequence number of an information subchannel to which an $(i+1)^{th}$ flag bit in the m flag bits is mapped is $x_{i+1}$ in the channel information bit sequence. The sequence number range $[x_i, x_{i+1})$ indicates that sequence numbers start from an information subchannel to which the $i^{th}$ flag bit in the m flag bits is mapped and end with an information subchannel previous to an information subchannel to the $(i+1)^{th}$ flag bit in the m flag bits is mapped.

For example, as shown in FIG. 9, a sequence number of an information subchannel to which the $1^{st}$ flag bit in the m flag bits is mapped is $x_1$ in the channel information bit sequence, and a sequence number of an information subchannel to which the $2^{nd}$ flag bit in the m flag bits is mapped is $x_2$ in the channel information bit sequence, and a bit mapped to an information subchannel whose sequence number is $x_1$ and a bit mapped to an information subchannel with the lowest reliability in information subchannels whose sequence number range is $[x_1, x_2)$ are exchanged. A method for determining an information subchannel to which the $i^{th}$ flag bit in the m flag bits is mapped similar to that for the $1^{st}$ flag bit in the m flag bits.

It may be understood that, when an information subchannel to which an $m^{th}$ flag bit in the m flag bits is mapped is determined, if after the mapping in the natural order, there are other information subchannels following the information subchannel to which the $m^{th}$ flag bit is mapped, a bit mapped to an information subchannel whose sequence number is $x_m$ and a bit mapped to an information subchannel with the lowest reliability in the other information subchannels are exchanged. Certainly, the bit on the information subchannel whose sequence number is $x_m$ may not be exchanged, which is shown in FIG. 9. If there is no other information subchannel following the information subchannel to which the $m^{th}$ flag bit is mapped, the bit on the information subchannel whose sequence number is $x^m$ are not exchanged, that is, the bits are mapped in an original natural order.

It may be understood that, in the foregoing descriptions, for ease of understanding by persons skilled in the art, the interleaving mapping process is divided into two steps: natural order based mapping and exchange. In an actual application, the natural mapping step may be omitted according to the same mapping rule, and the source coding codeword is directly mapped to the information subchannels to obtain the to-be-encoded channel bits. Results obtained in the two manners are the same. For example, FIG. 9 is still used as an example. Bits in the source coding codeword are mapped to information subchannels one by one according to a natural order. When the 1$^{st}$ flag bit is encountered, the 1$^{st}$ flag bit is directly mapped to an information subchannel with the lowest reliability in [$x_1$, $x_2$). When a bit corresponding to the information subchannel with the lowest reliability in [$x_1$, $x_2$) in the source coding codeword is encountered, the bit is mapped to an information subchannel corresponding to the 1$^{st}$ flag bit.

Certainly, parallel mapping may be performed according to a mapping rule. For example, the source coding codeword is mapped to the information subchannels in parallel based on a mapping pattern corresponding to the mapping rule.

The polar encoding method provided in the embodiment in FIG. 8 is a joint source-channel coding method. Some embodiments of this application further provide a polar decoding method, which may be referred to as a joint source-channel decoding method, to improve performance of source polar codes. The polar decoding method is a separately protected solution in embodiments of this application, or may be combined based on the polar encoding scheme provided in FIG. 8, to form a solution that needs to be protected in embodiments of this application. The following separately describes two possible polar decoding methods.

Figure 10:
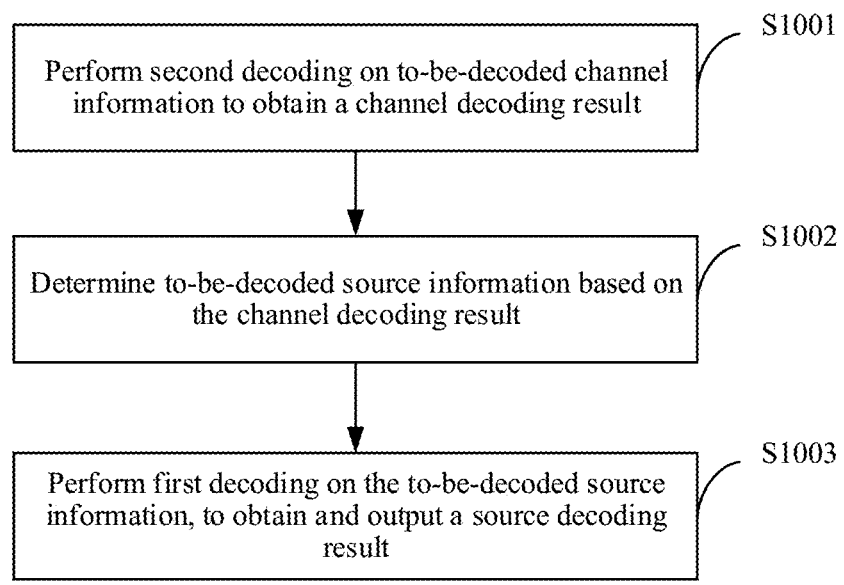
FIG. 10 is a schematic flowchart 2 of a polar decoding method according to some embodiments of this application.

As shown in FIG. 10, a procedure of a polar decoding method provided in some embodiments of this application is as follows:

The method is performed by a receiver or a decoder, and the receiver or the decoder may be a terminal device or a network device. The receiver receives to-be-decoded source information from a transmitter, and performs polar decoding according to the following method. Alternatively, the decoder receives to-be-decoded source information from an encoder, and performs polar decoding according to the following method. If the receiver or the decoder is a terminal device, the transmitter or the encoder may be a network device. If the receiver or the decoder is a network device, the transmitter or the encoder may be a terminal device.

S1001. Perform second decoding on to-be-decoded channel information to obtain a channel decoding result.

S1002. Determine to-be-decoded source information based on the channel decoding result.

This step may correspond to step S601 of obtaining the to-be-decoded source information. For example, the channel decoding result includes L1 to-be-decoded candidate source vectors whose reliability is in descending order, and the to-be-decoded source information is one of the L1 to-be-decoded candidate source vectors. A to-be-decoded candidate source vector may be selected as the to-be-decoded source information based on a path metric value or reliability.

S1003. Perform first decoding on the to-be-decoded source information, to obtain and output a source decoding result.

For a method for performing first decoding on the to-be-decoded source information, refer to the decoding process in the embodiment in FIG. 6, or another decoding method, for example, SC decoding, may be used.

In the embodiment in FIG. 10, joint channel-source decoding is used. Channel decoding is first performed, and candidate channel decoding paths are output. For example, L channel decoding paths are output, where L is a decoding path width. A channel decoding path with the highest reliability is selected based on the path metric value, and first decoding, that is, source decoding, is performed on the channel decoding path with the highest reliability, to obtain a source decoding result.

If an encoder uses check coding, for example, CRC check coding, when performing channel coding, a decoder may further perform decoding according to the following method: Channel decoding is first performed, and candidate channel decoding paths are output. For example, L channel decoding paths are output, where L is a decoding path width. According to the path metric value, starting from the channel decoding path with the highest reliability, first decoding, that is, source decoding, is performed on the channel decoding path with the highest reliability, and a source decoding result is checked. If the check succeeds, the source decoding result is output. If the check fails, first decoding is then performed on a channel decoding path with the second highest reliability, and an obtained source decoding result of the channel decoding path with the second highest reliability is checked. If the check succeeds, the source decoding result is output. If the check fails, first decoding continues to be performed until the check succeeds and a source decoding result is output, or until all channel decoding paths are traversed. If all the channel decoding paths are traversed, and there is no source decoding result that is successfully checked, a source decoding result of a channel decoding path with the highest reliability may be output.

The following further describes the embodiment in FIG. 8 and the embodiment in FIG. 10 in detail with reference to an application scenario.

Figure 11A:
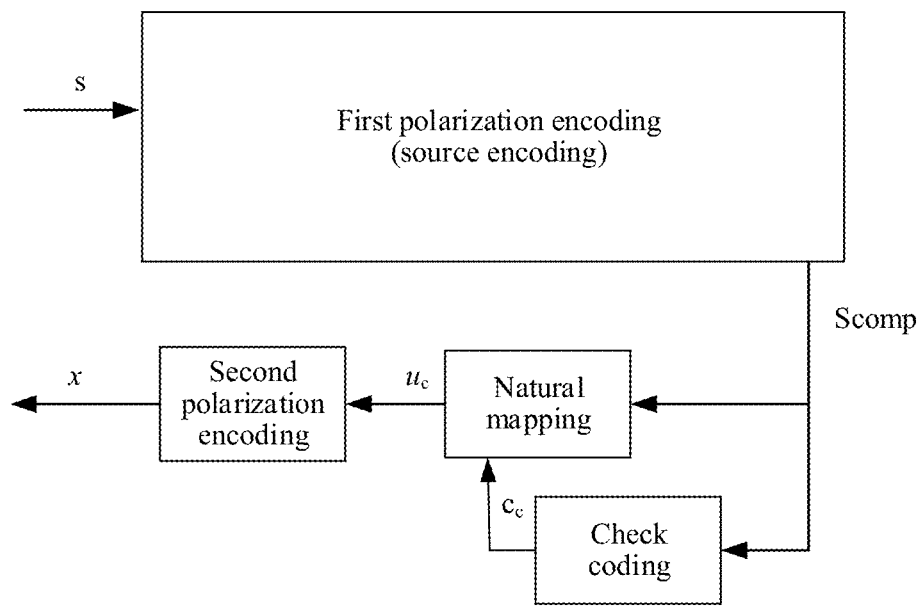
FIG. 11a is a schematic diagram 1 of a polar encoding process according to some embodiments of this application.

For example, for the scenario in which the source coding codeword is mapped to information subchannels according to the mapping rule A in the embodiment in FIG. 8, an encoding process and a decoding process are described as follows: As shown in FIG. 11*a*, the coding process includes a source coding process and a channel coding process.

The source coding process is as follows: First polar encoding is performed on to-be-encoded source bits s, to obtain and output a source coding codeword $s_{comp}$. For the source coding process, refer to the coding process in any one of the foregoing application scenarios 1 to 4. Details are not described herein again.

The channel coding process is as follows: Check coding, for example, CRC coding, is performed on an output source coding codeword $s_{comp}$ to obtain a check coding codeword $c_c$; $s_{comp}$ and $c_c$ are mapped to information subchannels in a natural order, that is, $s_{comp}$ and $c_c$ are placed in a natural mapping manner on information bits of an input sequence u of a channel polar code encoder; and polarization transformation is performed on u to obtain a final codeword x.

Figure 11B:
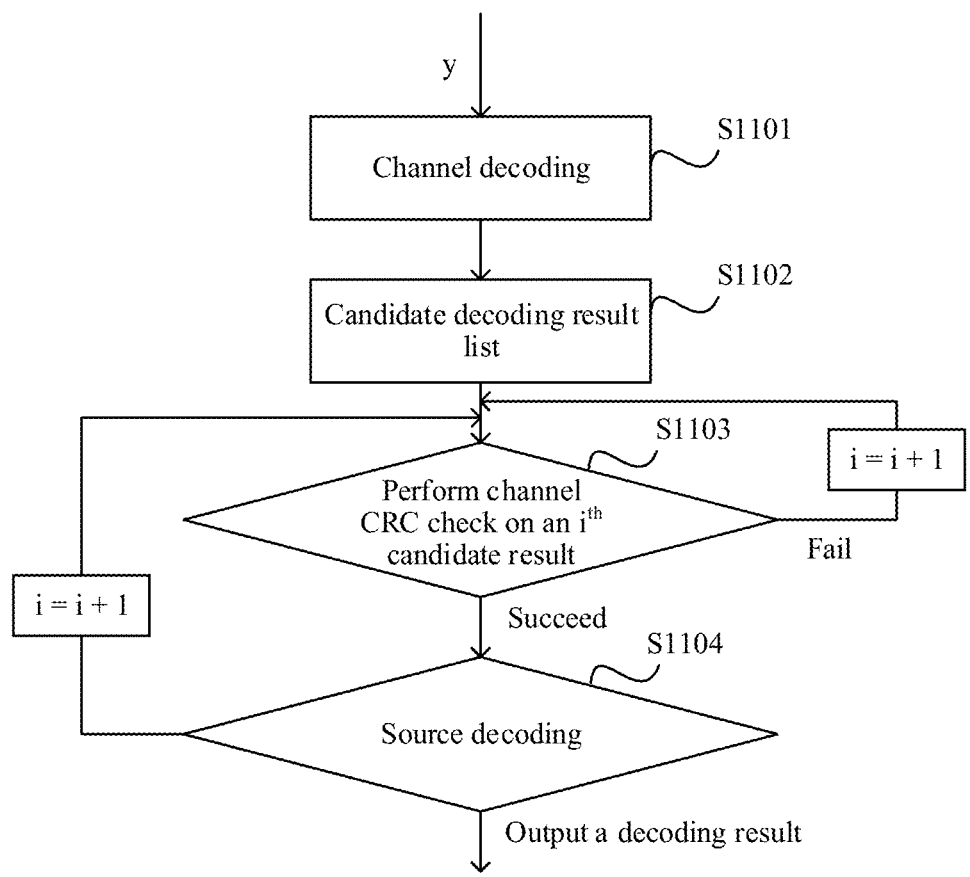
FIG. 11b is a schematic diagram 1 of a polar decoding process according to some embodiments of this application.

The decoding process is shown in FIG. 11*b*. A decoding method may be a list decoding method.

S1101. Perform channel decoding on to-be-decoded channel information y to obtain L candidate vectors.

S1102. The L candidate vectors may be sorted in descending order of reliability or probabilities, to obtain a candidate decoding result list L={$\hat{u}_i$}, i=1, 2, . . . , L.

S1103. Perform a channel CRC check on an i$^{th}$ candidate result in the candidate decoding result list, and if the check succeeds, go to S1104; otherwise, return to S1103, and perform a channel CRC check on an (i+1)$^{th}$ candidate result in the candidate decoding result list. Candidate results in the candidate decoding result list L are sorted in descending order of reliability or probabilities, and a value of i may start from 1, that is, start from a candidate result with the highest reliability or probability.

S1104. Perform source decoding on a candidate decoding result that is successfully checked, and if a source decoding result can be determined, output the source decoding result; otherwise, return to S1103, and perform a channel CRC check on the (i+1)$^{th}$ candidate result in the candidate decoding result list. If all candidate results in the candidate decoding result list are traversed, and no source decoding result can be determined when S1104 is performed, a candidate result with the highest reliability in the candidate decoding result list is selected to perform source decoding, and a source decoding result is output.

For a process of performing source decoding on the candidate decoding result that is successfully checked in S1104, refer to an encoding process in any one of the foregoing application scenarios 1 to 4. Details are not described herein again. Optionally, when the encoding method in FIG. 11a is used in combination with the decoding method in FIG. 11b, an application scenario of the method used in FIG. 11a is consistent with that of the method used in FIG. 11b. For example, the encoding method in FIG. 11a uses the encoding process in the application scenario 1, and correspondingly, the decoding method in FIG. 11b uses the decoding process in the application scenario 1.

When the decoding process in the application scenario 1 is used, in S1104, source decoding is performed on the candidate decoding result that is successfully checked. If there is a result on which the source CRC can succeed, it is considered that the source decoding result can be determined, and further polarization transformation is performed on the result on which the source CRC succeeds, to obtain the source decoding result. If there is no result on which the source CRC can succeed, S1103 is returned to.

The polar decoding method in the embodiment in FIG. 10 is joint source-channel decoding, and source decoding is performed after all bits in channel decoding are decoded.

Figure 12:
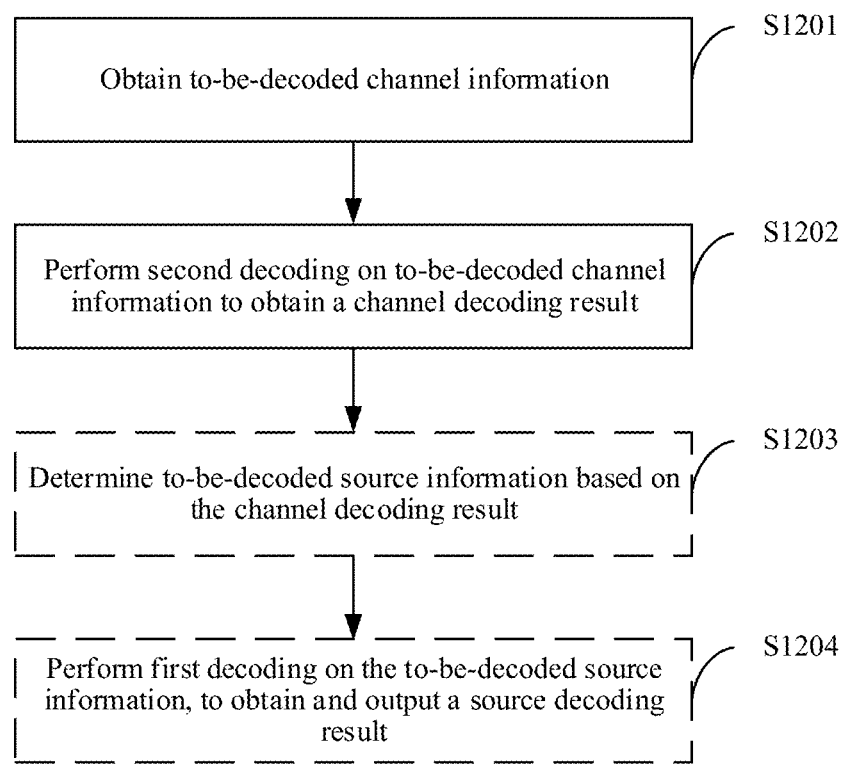
FIG. 12 is a schematic flowchart 3 of a polar decoding method according to some embodiments of this application.

As shown in FIG. 12, a procedure of another polar decoding method provided in some embodiments of this application is as follows:

The method is performed by a receiver or a decoder, and the receiver or the decoder may be a terminal device or a network device. The receiver receives to-be-decoded source information from a transmitter, and performs polar decoding according to the following method. Alternatively, the decoder receives to-be-decoded source information from an encoder, and performs polar decoding according to the following method. If the receiver or the decoder is a terminal device, the transmitter or the encoder may be a network device. If the receiver or the decoder is a network device, the transmitter or the encoder may be a terminal device.

S1201. Obtain to-be-decoded channel information.

S1202. Perform second decoding on the to-be-decoded channel information to obtain a channel decoding result.

A path metric value corresponding to an $n1^{th}$ channel information bit is determined based on the following information: a path metric value corresponding to an $(n1-1)^{th}$ channel information bit, a path metric increment corresponding to the $n1^{th}$ channel information bit, and a metric value corresponding to an $n2^{th}$ source fixed bit obtained when first decoding is performed on the to-be-decoded source information to obtain the $n2^{th}$ source fixed bit, where n1 and n2 are both positive integers.

According to the polar decoding method provided in the embodiment in FIG. 12, in a channel decoding process, when some bits are decoded, source decoding is performed on those bits based on a channel decoding result of those bits, and a value of the source decoding of those bits is fed back to channel decoding of a next bit. In this way, soft information of the source decoding can assist decoding of channel information bits.

The following describes an optional implementation of the embodiment in FIG. 12.

For the path metric value corresponding to the $n1^{th}$ channel information bit, paths for all bits before the $n1^{th}$ channel information bit need to be considered, including a channel information bit and a channel fixed bit.

The second decoding is performed on the to-be-decoded channel information, where the second decoding may be referred to as channel decoding. In a conventional channel decoding method, when an $x^{th}$ information bit $u_x$ is decoded, an obtained path metric value corresponding to the $x^{th}$ information bit is a sum of a path metric value corresponding to a decoded $(x-1)^{th}$ information bit and a path metric increment corresponding to the $x^{th}$ information bit. The following formula may be for expression: $PM_1^x = PM_1^{x-1} + \Delta PM(u_x)$.

In some embodiments of this application, when channel decoding is performed on some special bits, source decoding is performed, and a channel decoding result of the special bits is obtained with assistance based on the source decoding. For other information bits except these special bits, channel decoding may be performed according to a conventional channel decoding method.

For example, there are a total of K channel information bits, whose sequence numbers are 1, 2, ..., and K, and a special bit has a sequence number n1 in the K channel information bits. n1 may be a sequence number in 1 to K. When an $n1^{th}$ channel information bit is decoded, first decoding, that is, source decoding, is performed on the to-be-decoded source information. In addition, when an $n2^{th}$ source fixed bit is decoded, a metric value corresponding to the $n2^{th}$ source fixed bit is obtained. A path metric value corresponding to the $n1^{th}$ channel information bit is obtained with assistance based on the obtained metric value corresponding to the $n2^{th}$ source fixed bit. An information sub-channel on which the $n1^{th}$ channel information bit is located has a mapping relationship with the $n2^{th}$ source fixed bit in the to-be-decoded source information. When the $n1^{th}$ channel information bit is decoded, information about the $1^{st}$ to the $(n1-1)^{th}$ channel information bits is obtained. Information about all source bits before the $n2^{th}$ source fixed bit may be determined based on the information about the $1^{st}$ to the $(n1-1)^{th}$ channel information bits, where the source bits include source fixed bits and source redundant bits. For example, 1-(n2-1) source fixed bits are obtained by using 1-(n1-1) channel information bits. On the premise that 1-(n2-1) source fixed bits are known, source decoding may be performed on a source redundant bit previous to the $n2^{th}$ source fixed bit, to obtain the information about all the source bits before the $n2^{th}$ source fixed bit. A metric value corresponding to the $n2^{th}$ source fixed bit may be determined based on the information about all the source bits before the $n2^{th}$ source fixed bit. For example, information about the $1^{st}$ to the $(n2-1)^{th}$ source fixed bits may be determined based on the information about the $1^{st}$ to the $(n1-1)^{th}$ channel information bits, and information about source redundant bits before the $n2^{th}$ source fixed bit may be learned based on the information about the $1^{st}$ to the $(n2-1)^{th}$ source fixed bits. In this way, the information about all the source bits before the $n2^{th}$ source fixed bit may be obtained. Then, the metric value corresponding to the $n2^{th}$ source fixed bit is determined based on the information about all the source bits before the $n2^{th}$ source fixed bit. Optionally, soft information of the $n2^{th}$ source fixed bit may be first determined based on the information about all the source bits before the $n2^{th}$ source fixed bit, and the metric value corresponding to the $n2^{th}$ source fixed bit is determined based on the soft information of the $n2^{th}$ source fixed bit.

If a conventional channel decoding method is used, the path metric value corresponding to the $n1^{th}$ channel information bit may be determined based on a path metric value corresponding to a decoded $(n1-1)^{th}$ information bit and a path metric increment corresponding to the $n1^{th}$ channel information bit. In some embodiments of this application, the path metric value corresponding to the $n1^{th}$ channel information bit is determined based on the following three: a path metric value corresponding to the decoded $(n1-1)^{th}$ information bit, the path metric increment corresponding to the $n1^{th}$ information bit, and the metric value corresponding to the $n2^{th}$ source fixed bit. In an optional implementation, the path metric value corresponding to the $n1^{th}$ channel information bit is a sum of the foregoing three values.

The following describes possible cases of special bits by using examples.

1. The special bit may be a flag bit, and the flag bit is the flag bit described in the mapping rule B in the foregoing encoding embodiment. At the encoder, the source coding codeword includes a flag bit, and the source coding codeword is mapped to the information subchannels according to the mapping rule B to obtain to-be-encoded channel bits. Correspondingly, at the decoder, the flag bit may be used as a special bit, and channel decoding is performed based on the flag bit. A value of n1 may be a sequence number of an information subchannel corresponding to each flag bit in K information subchannels.

Channel decoding is performed on the to-be-decoded channel information. When a flag bit is decoded, source decoding is then performed on the to-be-decoded source information. When a source bit corresponding to the flag bit is decoded, a path metric increment corresponding to the source bit corresponding to the flag bit is obtained. There is a mapping relationship between an information subchannel on which the flag bit is located and a source bit. For determining of the mapping relationship, refer to the foregoing mapping rule B. That is, the mapping relationship is interleaving mapping, and the interleaving mapping is: sequentially mapping encoded source bits to information subchannels in a natural order to obtain a channel information bit sequence, where m bits in the encoded source bits are flag bits, and m is a positive integer; and exchanging a bit mapped to an information subchannel whose sequence number is $x_i$ and a bit mapped to an information subchannel whose sequence number is $x_j$, to obtain to-be-encoded channel bits, where $x_i$ is a sequence number, in the channel information bit sequence, of an information subchannel to which an $i^{th}$ flag bit in the m flag bits is mapped, and $x_j$ is a sequence number, in the channel information bit sequence, of an information subchannel with lowest reliability in information subchannels whose sequence number range is $[x_i, x_{i+1})$, where $x_{i+1}$ is a sequence number, in the channel information bit sequence, of an information subchannel to which an $(i+1)^{th}$ flag bit in the m flag bits is mapped, both i and j are positive integers, and i=1, 2, . . . , m. That is, the encoder performs encoding according to the mapping rule B, and the decoder may also determine, according to the mapping rule B, a source bit corresponding to the flag bit during decoding, and assist in determining a decoding result of the flag bit based on a path metric increment corresponding to the source bit. The encoder and the decoder may negotiate the mapping rule B in advance, or the mapping rule B is specified in a protocol.

When the special bit is a flag bit, the metric value corresponding to the $n2^{th}$ source fixed bit is a path metric increment corresponding to the $n2^{th}$ source fixed bit. The path metric value corresponding to the $n1^{th}$ channel information bit may be represented by using the following formula: $PM_1^{n1}=PM_1^{n1-1}+\Delta PM(u_{n1})+\Delta PMs(v_s(n2))$. $\Delta PMs$ represents a path metric increment corresponding to each source bit during source decoding. $v_s(n2)$ indicates the $n2^{th}$ source fixed bit. $\Delta PMs(v_s(n2))$ represents the path metric increment corresponding to the $n2^{th}$ source fixed bit. $PM_1^{n1}$ represents the path metric value corresponding to the $n1^{th}$ channel information bit. $PM_1^{n1-1}$ indicates a path metric value corresponding to the decoded $(n1-1)^{th}$ information bit. $\Delta PM(u_{n1})$ indicates the path metric increment corresponding to the $n1^{th}$ information bit.

When channel decoding is performed on a flag bit (the $n1^{th}$ information bit), first decoding, that is, source decoding, is then performed on the to-be-decoded source information. Source decoding may be performed by using information obtained through channel decoding.

2. The special bit may be any bit. For example, the special bit may be an information bit previous to a channel fixed bit location, and is denoted as an $n1^{th}$ channel information bit. The channel fixed bit is a channel frozen bit. In this scenario, a mapping relationship between an information subchannel on which the $n1^{th}$ channel information bit is located and the $n2^{th}$ source fixed bit in the to-be-decoded source information, may be natural sequential mapping, or may be interleaving mapping, but is not limited to this in this application. A value of n1 may be a sequence number corresponding to an information bit previous to each fixed bit location.

Channel decoding is performed on the to-be-decoded channel information. When an information bit (an $n1^{th}$ information bit in the K information bits) previous to a fixed bit location is decoded, source decoding is then performed on the to-be-decoded source information. The source bit corresponding to the $n1^{th}$ information bit is the $n2^{th}$ source fixed bit. When source decoding is performed on the $n2^{th}$ source fixed bit, a path metric value corresponding to the $1^{st}$ to the $n2^{th}$ source fixed bits is obtained.

When the special bit is any bit, the metric value corresponding to the $n2^{th}$ source fixed bit is a path metric value corresponding to the $1^{st}$ to the $n2^{th}$ source fixed bits. It should be noted that, for the path metric value corresponding to the $1^{st}$ to the $n2^{th}$ source fixed bits, a path of a source information bit before the $n2^{th}$ source fixed bit does not need to be considered, and only a path of a source fixed bit needs to be considered.

The path metric value corresponding to the $n1^{th}$ channel information bit may be represented by using the following formula: $PM_1^{n1}PM_1^{n1-1}+\Delta PM(u_{n1})+PMs(1:n2)$. PMs represents a path metric value corresponding to each source bit during source decoding. $PM_1^{n1}$ represents the path metric value corresponding to the $n1^{th}$ channel information bit. $PM_1^{n1-1}$ indicates a path metric value corresponding to the decoded $(n1-1)^{th}$ information bit. $\Delta PM(u_{n1})$ indicates the path metric increment corresponding to the $n1^{th}$ information bit.

When channel decoding is performed on a flag bit (the $n1^{th}$ information bit), first decoding, that is, source decoding, is then performed on the to-be-decoded source information. Source decoding may be performed by using information obtained through channel decoding.

The decoding method provided in the embodiment in FIG. 12 provides a channel decoding process. It may be understood that, when joint source-channel decoding is performed, after the second decoding is performed on the to-be-decoded channel information to obtain the channel decoding result in S1202, source decoding may be further performed. Optionally, after S1202, the method further includes the following steps.

S1203. Determine to-be-decoded source information based on the channel decoding result.

S1204. Perform first decoding on the to-be-decoded source information, to obtain and output a source decoding result.

For a method for performing first decoding on the to-be-decoded source information, refer to the decoding process in the embodiment in FIG. 6, or another decoding method, for example, SC decoding, may be used.

The embodiment in FIG. 12 includes a process of the first decoding and finally outputting the source decoding result. The joint source-channel decoding solution in the embodiment in FIG. 12 may be combined with the embodiment in FIG. 8, in which case, the encoder performs encoding by using the embodiment in FIG. 8, and the decoder performs decoding by using the embodiment in FIG. 12.

With reference to an application scenario, the following describes, by using an example, the case in which the embodiment in FIG. 12 includes the process of the first decoding and finally outputting the source decoding result. When the embodiment in FIG. 12 is combined with the embodiment in FIG. 8, as shown in FIG. 11a, the coding process includes a source coding process and a channel coding process. The source coding process is as follows: First polar encoding is performed on to-be-encoded source bits s, to obtain and output a source coding codeword $s_{comp}$. For the source coding process, refer to the coding process in any one of the foregoing application scenarios 1 to 4. Details are not described herein again. The channel coding process is as follows: Check coding, for example, CRC coding, is performed on an output source coding codeword $s_{comp}$ to obtain a check coding codeword $c_c$; $s_{comp}$ and $c_c$ are mapped to information subchannels in a natural order, that is, $s_{comp}$ and $c_c$ are placed in a natural mapping manner on information bits of an input sequence u of a channel polar code encoder; and polarization transformation is performed on u to obtain a final codeword x.

Figure 13:
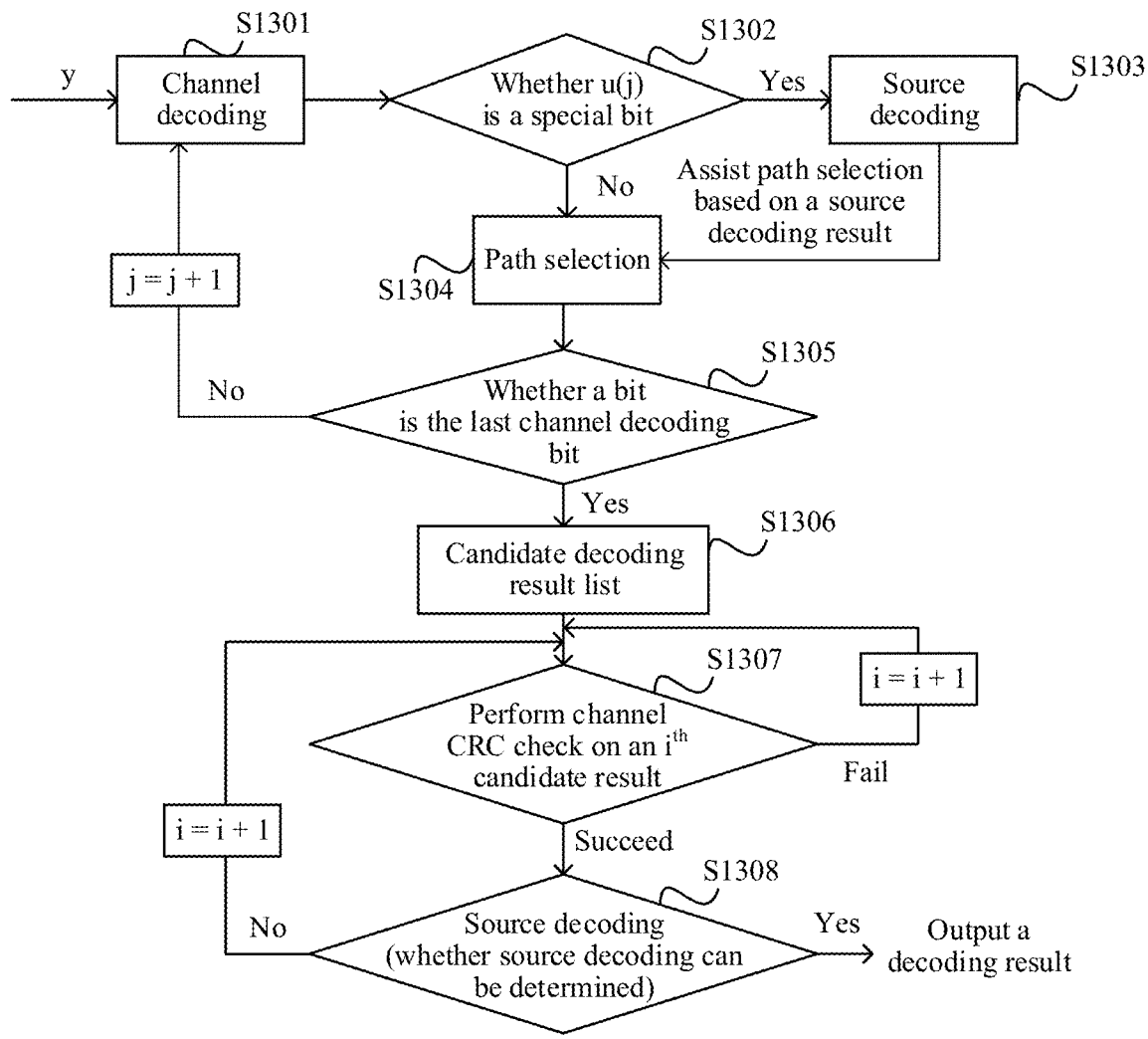
FIG. 13 is a schematic diagram 2 of a polar decoding process according to some embodiments of this application.

A decoding process is shown in FIG. 13.

S1301. Perform conventional channel decoding on to-be-decoded information y. The channel decoding method may be a list decoding method.

S1302. When a $j^{th}$ channel information bit u(j) is decoded, calculate a path metric increment corresponding to each channel decoding path corresponding to u(j)=0 and u(j)=1; determine whether the $j^{th}$ channel information bit u(j) currently decoded is a special bit; and if yes, perform S1303; otherwise, perform S1304.

S1303. Perform source decoding on to-be-decoded source information. When source decoding is performed on a source fixed bit corresponding to u(j), a metric value of the source fixed bit corresponding to u(j) is obtained. If the special bit is a flag bit, the value of the source fixed bit corresponding to u(j) is a path metric increment corresponding to the source fixed bit corresponding to u(j). If the special bit is any bit, for example, an information bit previous to a channel fixed bit location, the value of the source fixed bit corresponding to u(j) is a path metric value of the source fixed bit corresponding to u(j).

S1304. Perform path selection.

If the $j^{th}$ channel information bit u(j) is not a special bit, for channel decoding paths corresponding to u(j)=0 and u(j)=1, a path metric value corresponding to each channel decoding path u(j) may be determined based on the path metric increment corresponding to u(j) and a path metric value corresponding to a $(j-1)^{th}$ channel information bit u(j-1). In addition, a path is selected based on the path metric value corresponding to each channel decoding path u(j).

If the $j^{th}$ channel information bit u(j) is a special bit, for each channel decoding path corresponding to u(j)=0 and u(j)=1, a path metric value corresponding to each channel decoding path u(j) may be determined based on the path metric increment corresponding to u(j), a path metric value corresponding to a $(j-1)^{th}$ channel information bit u(j-1), and the metric value that is of the source fixed bit corresponding to u(j) and that is obtained in S1303. In addition, a path is selected based on the path metric value corresponding to each channel decoding path u(j).

S1305. Determine whether a bit is the last channel decoding bit; if yes, obtain L candidate vectors and go to S1306; otherwise, return to S1301, and continue to decode a next channel decoding bit. A process after S1306 is a source decoding process. For details, refer to the description of the source decoding method in FIG. 12.

S1306. The L candidate vectors may be sorted in descending order of reliability or probabilities, to obtain a candidate decoding result list L={$\hat{u}_i$}, i=1, 2, . . . , L.

S1307. Perform a channel CRC check on an $i^{th}$ candidate result in the candidate decoding result list, and if the check succeeds, go to S1308; otherwise, return to S1307, and perform a channel CRC check on an $(i+1)^{th}$ candidate result in the candidate decoding result list. Candidate results in the candidate decoding result list L are sorted in descending order of reliability or probabilities, and a value of i may start from 1, that is, start from a candidate result with the highest reliability or probability.

S1308. Perform source decoding on a candidate decoding result that is successfully checked, and if a source decoding result can be determined, output the source decoding result; otherwise, return to S1307, and perform a channel CRC check on the $(i+1)^{th}$ candidate result in the candidate decoding result list. If all candidate results in the candidate decoding result list are traversed, and no source decoding result can be determined when S1308 is performed, a candidate result with the highest reliability in the candidate decoding result list is selected to perform source decoding, and a source decoding result is output.

It may be understood that, for a process of performing source decoding on the candidate decoding result that is successfully checked in S1308, refer to an encoding process in any one of the foregoing application scenarios 1 to 4. Details are not described herein again.

Figure 14A:
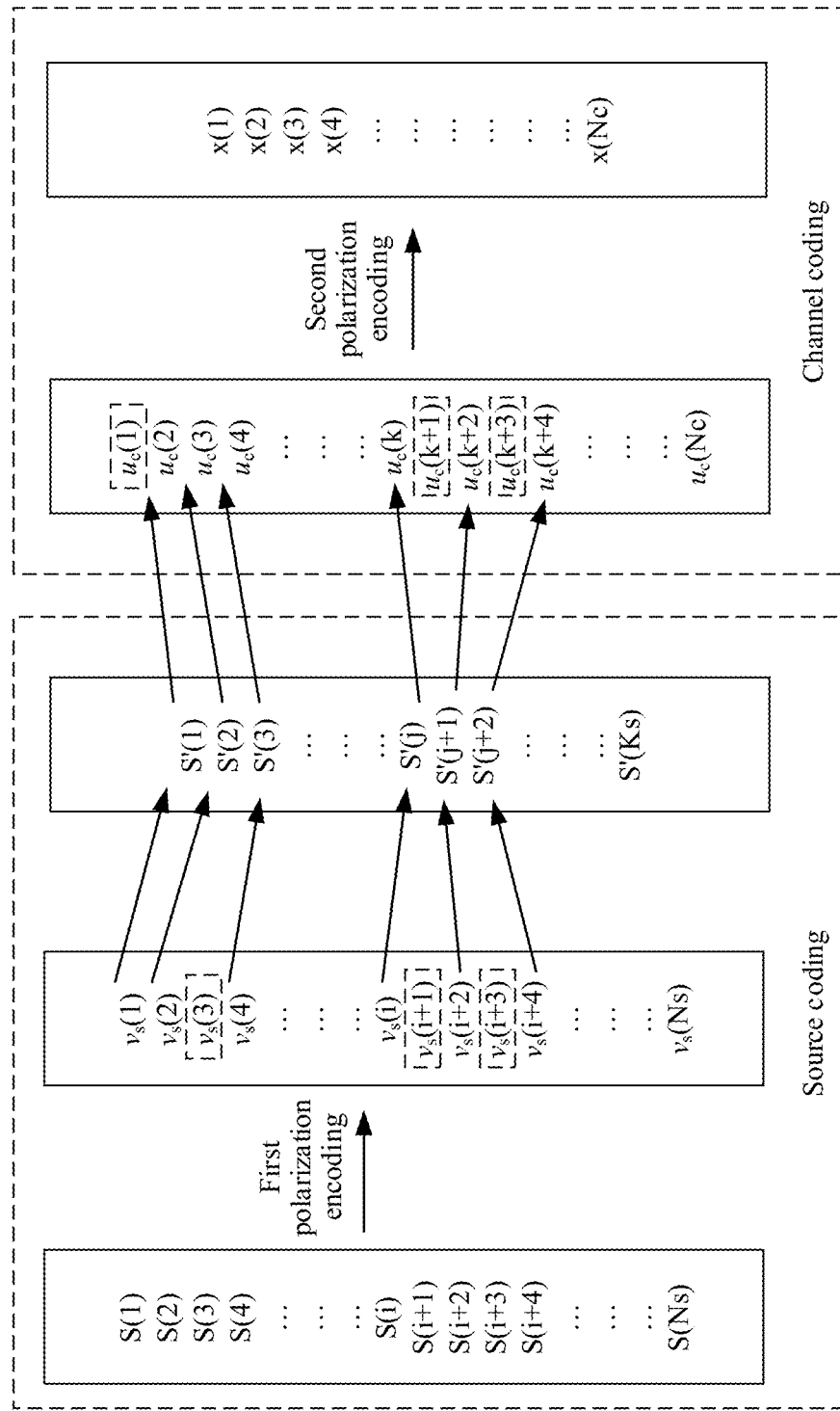
FIG. 14a is a schematic diagram 1 of a bit change and a mapping relationship in an encoding process according to some embodiments of this application.
Figure 14B:
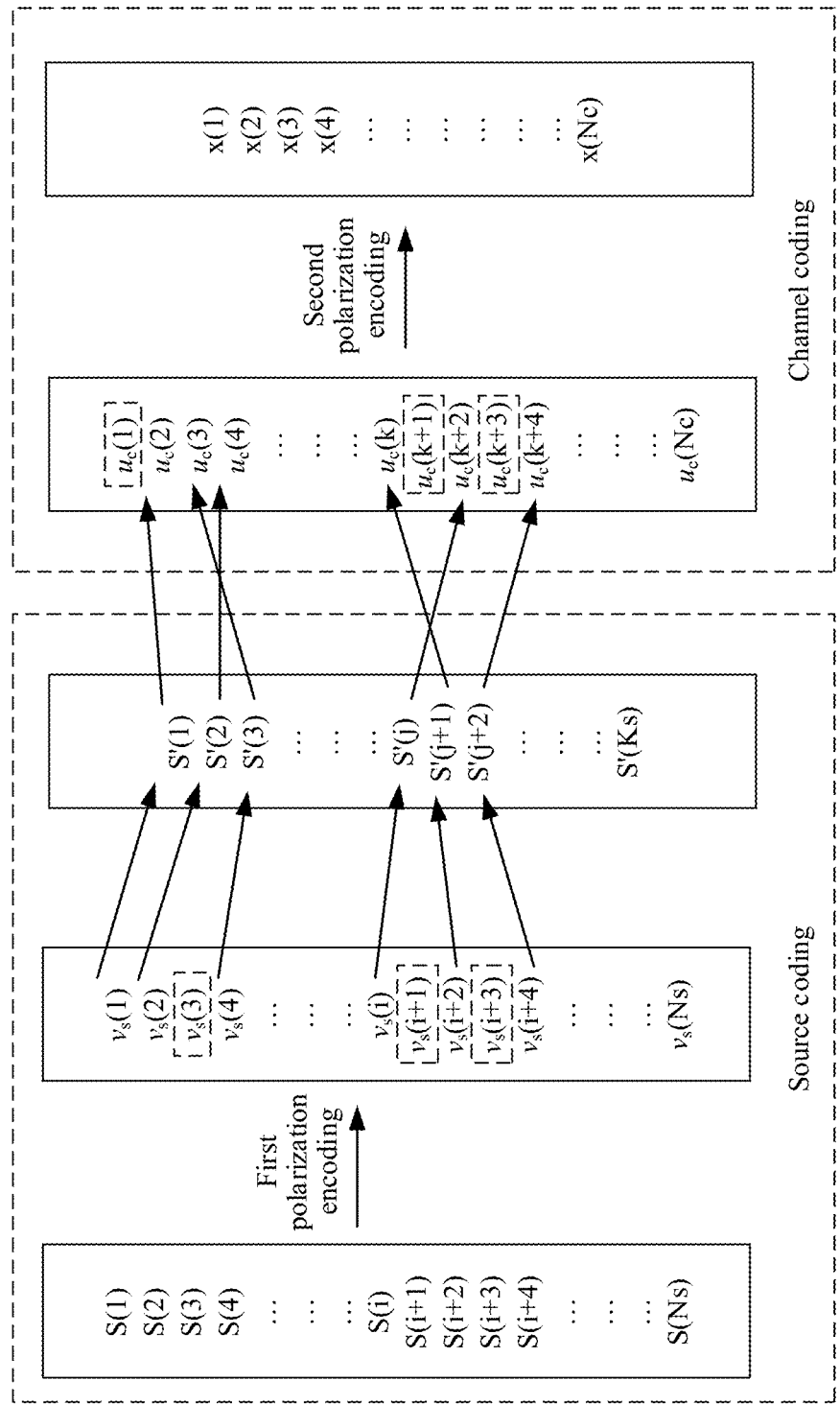
FIG. 14b is a schematic diagram 2 of a bit change and a mapping relationship in an encoding process according to some embodiments of this application.

With reference to the foregoing embodiments, as shown in FIG. 14a and FIG. 14b, the following describes a bit change and a mapping relationship in the encoding process. The to-be-encoded source bits are s(i), i=1, 2, . . . , Ns. After first polar encoding is performed on the to-be-encoded source bits, encoded source bits $v_s$={$v_s(1)$, $v_s(2)$, . . . , $v_s(N_s)$} are obtained. Bits in $v_s$ include source fixed bits and redundant bits. The redundant bits are deleted, and the redundant bits are framed by dashed line boxes in source coding in FIG. 14a and FIG. 14b. If a check coding, for example, a CRC check coding, is performed on the encoded source bits, a CRC check coding codeword of $v_s$ is added at the tail after the redundant bits are deleted, a source coding codeword s'={s'(1), s'(2), . . . , s'($K_s$)} is output in the source coding, and then channel coding is entered.

Input bits for channel coding are $u_c$={$u_c(1)$, $u_c(2)$, . . . , $u_c(N_c)$}, where $u_c$ includes channel fixed bits and channel information bits. The channel fixed bits are framed by dashed line boxes in source coding in FIG. 14a and FIG.

14b. The source coding codeword s'={s'(1), s'(2), ..., s'($K_s$)} is mapped to an information subchannel in $u_c$.

A mapping manner may be a mapping rule A, which is shown in FIG. 14a; or the mapping manner may be a mapping rule B, which is shown in FIG. 14b.

After the mapping is completed, second polar encoding is performed on $u_c$ to obtain a channel coding codeword x={x(1), x(2), ..., x($N_c$)}.

It should be noted that examples in the application scenarios in this application merely show some possible implementations, to help better understand and describe the method in this application. Persons skilled in the art could obtain different examples according to the methods provided in this application.

The foregoing describes the method provided in embodiments of this application. To implement the functions in the methods provided in embodiments of this application, embodiments of this application further provide a polar encoding apparatus and a polar decoding apparatus. The polar encoding apparatus and the polar decoding apparatus may include a hardware structure and/or a software module. The foregoing functions are implemented by a hardware structure, a software module, or a hardware structure and a software module. Whether a function in the foregoing functions is performed by using the hardware structure, the software module, or the combination of the hardware structure and the software module depends on particular applications and design constraints of the technical solutions.

Figure 15:
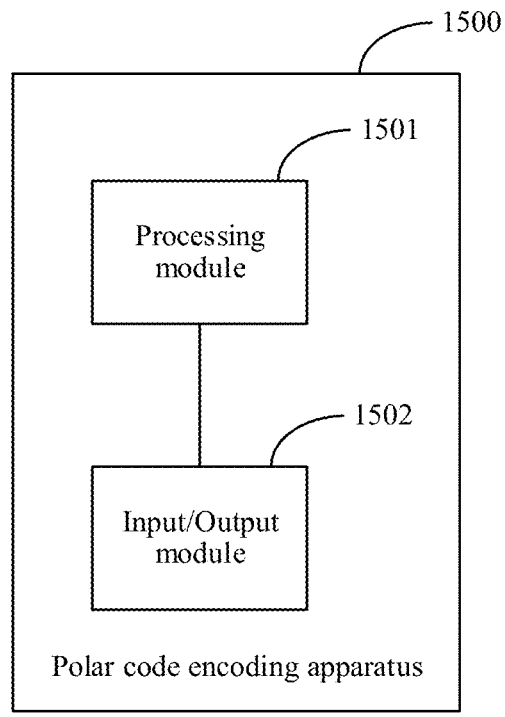
FIG. 15 is a schematic diagram 1 of a structure of a polar encoding apparatus according to some embodiments of this application.

As shown in FIG. 15, based on a same technical concept, some embodiments of this application further provide a polar encoding apparatus 1500. The polar encoding apparatus 1500 may be a terminal device or a network device. In some embodiments, the polar encoding apparatus 1500 may include a module for performing the foregoing polar encoding method. The module may be a hardware circuit, may be software, or may be implemented by a hardware circuit in combination with software. In some embodiments, the polar encoding apparatus 1500 may include a processing module 1501 and an input/output module 1502.

The processing module 1501 is configured to: obtain to-be-encoded source bits; perform first polar encoding on the to-be-encoded source bits to obtain encoded source bits, where the first polar encoding includes first transformation and second transformation, the first transformation is polarization transformation, a mother code length corresponding to the first transformation is Ns, the polarization transformation is performed on the to-be-encoded source bits to obtain first source bits, and the second transformation is performed on the first source bits to obtain the encoded source bits; and determine assistance information based on the first source bits.

The input/output module 1502 is configured to output a source coding codeword, where the source coding codeword includes the encoded source bits and the assistance information.

Optionally, the second transformation includes one or more of the following operations: a convolution operation, an upper triangular transformation operation, a compression operation, or an interleaving operation.

Optionally, when determining the assistance information based on the first source bits, the processing module 1501 is configured to: perform a check coding on the first source bits to obtain check bits, where the check bits are the assistance information.

Optionally, when determining the assistance information based on the first source bits, the processing module 1501 is configured to: perform first decoding on the encoded source bits to obtain at least one candidate decoding result; determine a first decoding result that is in the at least one candidate decoding result and that matches the first source bits; and determine that indication information of the first decoding result is the assistance information.

Optionally, when performing first decoding on the encoded source bits to obtain the at least one candidate decoding result, the processing module 1501 is configured to perform first decoding on the encoded source bits to obtain L candidate vectors, where L is a positive integer. When determining the first decoding result that is in the at least one candidate decoding result and that matches the first source bits, the processing module 1501 is configured to: compare the L candidate vectors with the first source bits; and determine a first vector in the L candidate vectors that is the same as the first source bits, where information about a sequence number of the first vector in the L candidate vectors is the indication information.

Optionally, the processing module 1501 is further configured to: perform second polar encoding on the source coding codeword to obtain a channel coding codeword, where a mother code length corresponding to the second polar encoding is Nc. The input/output module is further configured to output the channel coding codeword.

Optionally, m bits in the source coding codeword are flag bits, and m is a positive integer. When performing second polar encoding on the source coding codeword, the processing module 1501 is configured to: map, according to a mapping rule, the source coding codeword to information subchannels of a polarization subchannel of the second polar encoding, to obtain to-be-encoded channel bits, where the mapping rule includes interleaving mapping, and the interleaving mapping is: sequentially mapping the source coding codeword to the information subchannels in a natural order to obtain a channel information bit sequence; and exchanging a bit mapped to an information subchannel whose sequence number is $x_i$ and a bit mapped to an information subchannel whose sequence number is $x_j$, to obtain the to-be-encoded channel bits, where $x_i$ is a sequence number, in the channel information bit sequence, of an information subchannel to which an $i^{th}$ flag bit in the m flag bits is mapped, and $x_j$ is a sequence number, in the channel information bit sequence, of an information subchannel with lowest reliability in information subchannels whose sequence number range is [$x_i$, $x_{i+1}$), where $x_{i+1}$ is a sequence number, in the channel information bit sequence, of an information subchannel to which an $(i+1)^{th}$ flag bit in the m flag bits is mapped, both i and j are positive integers, and i=1, 2, ..., m; and perform second polar encoding on to-be-coded channel bits.

Optionally, reliability of the m flag bits is higher than reliability of other bits except the m flag bits in the encoded source bits.

The processing module 1501 may further perform other operations of the encoding method in the foregoing method embodiments. Details are not described herein again.

Figure 16:
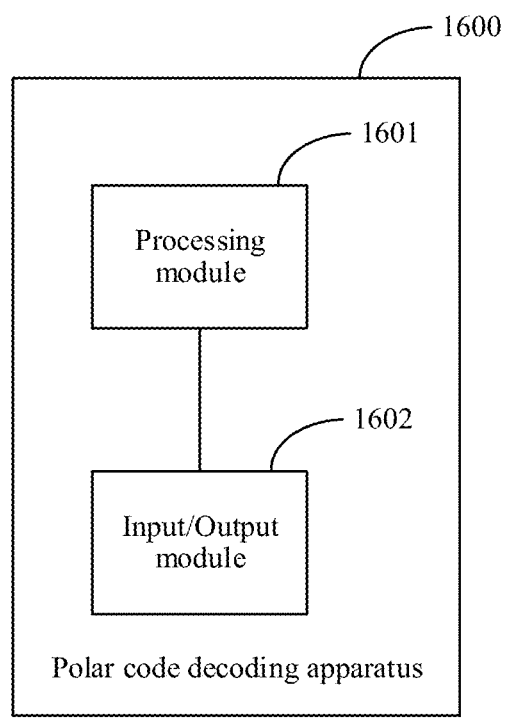
FIG. 16 is a schematic diagram 1 of a structure of a polar decoding apparatus according to some embodiments of this application.

As shown in FIG. 16, based on a same technical concept, some embodiments of this application further provide a polar decoding apparatus 1600. The polar decoding apparatus 1600 may be a terminal device or a network device. In some embodiments, the polar decoding apparatus 1600 may include a module for performing the foregoing polar decoding method. The module may be a hardware circuit, may be software, or may be implemented by a hardware circuit in combination with software. In some embodiments, the polar decoding apparatus 1600 may include a processing module 1601 and an input/output module 1602.

In some embodiments, the processing module 1601 is configured to: obtain to-be-decoded source information, where the to-be-decoded source information includes assistance information; perform first decoding on the to-be-decoded source information to obtain L candidate vectors, where L is a positive integer; determine a first vector in the L candidate vectors based on assistance information, where the assistance information is check bits or indication information, and the indication information indicates a sequence number of the first vector in the L candidate vectors; and perform polarization transformation on the first vector to obtain a source decoding result.

The input/output module 1602 is configured to output the source decoding result.

Optionally, the assistance information is check bits; and when determining the first vector in the L candidate vectors based on assistance information, the processing module 1601 is configured to: sequentially check, based on the check bits, the L candidate vectors in descending order of reliability; and when the check succeeds, determine a candidate vector on which the check succeeds as the first vector.

Optionally, the assistance information is indication information, and the indication information indicates a sequence number of the first vector in the L candidate vectors. When determining the first vector in the L candidate vectors based on the assistance information, the processing module 1601 is configured to: determine, based on the indication information, the first vector corresponding to the sequence number indicated by the indication information in the L candidate vectors.

Optionally, when obtaining the to-be-decoded source information, the processing module 1601 is configured to: perform second decoding on to-be-decoded channel information to obtain a channel decoding result, where the channel decoding result includes L1 to-be-decoded candidate source vectors in descending order of reliability, and the to-be-decoded source information is one of the L1 to-be-decoded candidate source vectors.

In another embodiment, the input/output module 1602 is configured to obtain to-be-decoded channel information.

The processing module 1601 is configured to perform second decoding on the to-be-decoded channel information to obtain a channel decoding result, where a path metric value corresponding to an $n1^{th}$ channel information bit is determined based on the following information: a path metric value corresponding to an $(n1-1)^{th}$ channel information bit, a path metric increment corresponding to the $n1^{th}$ channel information bit, and a metric value corresponding to an $n2^{th}$ source fixed bit obtained when first decoding is performed on the to-be-decoded source information to obtain the $n2^{th}$ source fixed bit, where n1 and n2 are both positive integers.

Optionally, when the metric value of the $n2^{th}$ source fixed bit is obtained by performing first decoding on the to-be-decoded source information, the processing module 1601 is configured to obtain a path metric value corresponding to the $1^{st}$ to the $n2^{th}$ source fixed bits when first decoding is performed on the to-be-decoded source information to obtain the $n2^{th}$ source fixed bit.

Optionally, when the metric value of the $n2^{th}$ source fixed bit is obtained by performing first decoding on the to-be-decoded source information, the processing module 1601 is configured to obtain a path metric increment corresponding to the $n2^{th}$ source fixed bit when first decoding is performed on the to-be-decoded source information to obtain the $n2^{th}$ source fixed bit.

Optionally, an information subchannel on which the $n1^{th}$ channel information bit is located has a mapping relationship with the $n2^{th}$ source fixed bit in the to-be-decoded source information.

Optionally, the mapping relationship is interleaving mapping, and the interleaving mapping is: sequentially mapping encoded source bits to information subchannels in a natural order to obtain a channel information bit sequence, where m bits in the encoded source bits are flag bits, and m is a positive integer; and exchanging a bit mapped to an information subchannel whose sequence number is $x_i$ and a bit mapped to an information subchannel whose sequence number is $x_j$, to obtain to-be-encoded channel bits, where $x_i$ is a sequence number, in the channel information bit sequence, of an information subchannel to which an $i^{th}$ flag bit in the m flag bits is mapped, and $x_j$ is a sequence number, in the channel information bit sequence, of an information subchannel with lowest reliability in information subchannels whose sequence number range is $[x_i, x_{i+1})$, where $x_{i+1}$ is a sequence number, in the channel information bit sequence, of an information subchannel to which an $(i+1)^{th}$ flag bit in the m flag bits is mapped, both i and j are positive integers, and i=1, 2, . . . , m.

Optionally, the path metric value corresponding to the $n1^{th}$ channel information bit is a sum of the following three: the path metric value corresponding to the $(n1-1)^{th}$ channel information bit, the path metric increment corresponding to the $n1^{th}$ channel information bit, and the metric value corresponding to the $n2^{th}$ source fixed bit obtained when second decoding is performed on to-be-decoded source information to obtain the $n2^{th}$ source fixed bit.

Optionally, the processing module 1601 is further configured to: determine the to-be-decoded source information based on the channel decoding result; perform first decoding on the to-be-decoded source information to obtain L candidate vectors, where L is a positive integer; determine a first vector in the L candidate vectors based on assistance information, where the assistance information is check bits or indication information, and the indication information indicates a sequence number of the first vector in the L candidate vectors; and perform polarization transformation on the first vector to obtain a source decoding result.

The input/output module 1602 is configured to output the source decoding result.

The processing module 1601 may further perform other operations of the decoding method in the foregoing method embodiments. Details are not described herein again.

The modules recited in embodiments of this application are merely examples based on separation of logical functions, but there may be other division of functions into different modules during actual implementation. In addition, functional modules in embodiments of this application may be integrated into one processor, and each of the modules may exist alone physically, or two or more modules may be integrated into one module. The integrated module may be implemented in a form of hardware, or may be implemented in a form of a software functional module.

Figure 17:
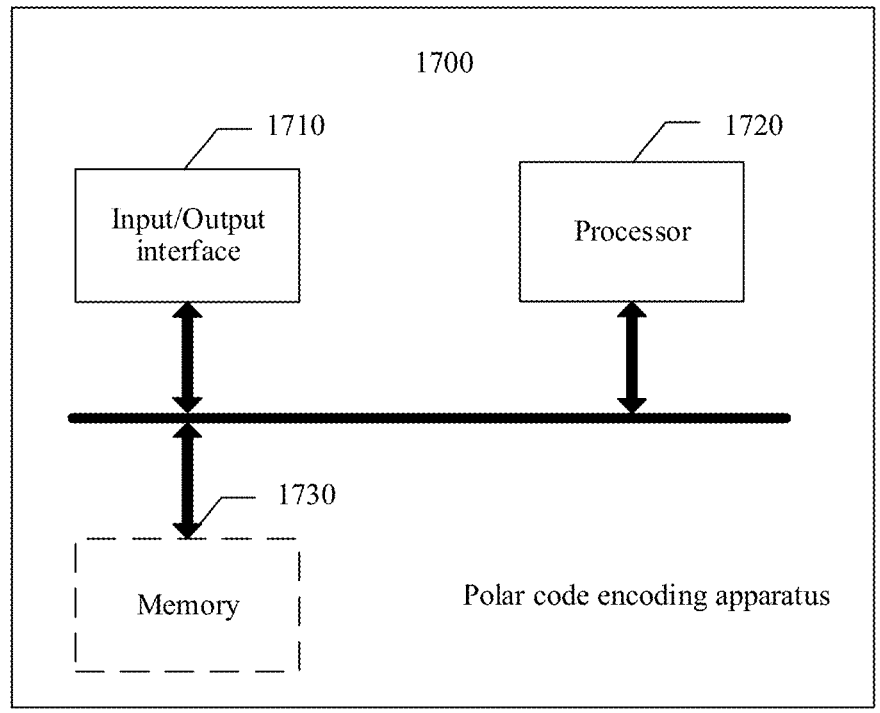
FIG. 17 is a schematic diagram 2 of a structure of a polar encoding apparatus according to some embodiments of this application.

FIG. 17 shows a polar encoding apparatus 1700 according to some embodiments of this application. The apparatus is configured to implement the polar encoding method provided in this application. The polar encoding apparatus 1700 may be a terminal device or a network device. The polar encoding apparatus 1700 may be a chip system or a chip. In some embodiments of this application, the chip system may include a chip, or may include a chip and another discrete component. The polar encoding apparatus 1700 includes at least one processor 1720, configured to implement the polar encoding method provided in embodiments of this application. The polar encoding apparatus 1700 may further include an input/output interface 1710. In some embodiments of this application, the input/output interface 1710 is configured to communicate with another apparatus by using a transmission medium. For example, when the polar encoding apparatus 1700 is a chip, the polar encoding apparatus performs transmission with another chip or device through the input/output interface 1710. The processor 1720 is configured to implement the method in the foregoing embodiments.

The processor 1720 is configured to: obtain to-be-encoded source bits; perform first polar encoding on the to-be-encoded source bits to obtain encoded source bits, where the first polar encoding includes first transformation and second transformation, the first transformation is polarization transformation, a mother code length corresponding to the first transformation is Ns, the polarization transformation is performed on the to-be-encoded source bits to obtain first source bits, and the second transformation is performed on the first source bits to obtain the encoded source bits; and determine assistance information based on the first source bits.

The input/output interface 1710 is configured to output a source coding codeword, where the source coding codeword includes the encoded source bits and the assistance information.

The processor 1720 may further perform other operations of the encoding method in the foregoing method embodiments. Details are not described herein again.

The polar encoding apparatus 1700 may further include at least one memory 1730, configured to store program instructions and/or data. The memory 1730 is coupled to the processor 1720. The coupling, in some embodiments of this application, may be an indirect coupling or a communication connection between apparatuses, units, or modules in an electrical form, a mechanical form, or another form, and is used for information exchange between the apparatuses, the units, or the modules. The processor 1720 may cooperate with the memory 1730. The processor 1720 may execute the program instructions stored in the memory 1730. At least one of the memory may be integrated with the processor.

In some embodiments of this application, the memory 1730 may be a non-volatile memory, such as a hard disk drive (HDD) or a solid-state drive (SSD), or may be a volatile memory, such as a random access memory (RAM). The memory can be any medium that can carry or store program code in a form of instructions or a data structure and that can be accessed by a computer, but is not limited thereto. The memory, in some embodiments of this application, may alternatively be a circuit or any other apparatus that can implement a storage function, and is configured to store the program instructions and/or the data.

In some embodiments of this application, the processor 1720 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor or any conventional processor or the like. The steps of the methods disclosed with reference to embodiments of this application may be directly performed by a hardware processor, or may be performed by using a combination of hardware in the processor and a software module.

Figure 18:
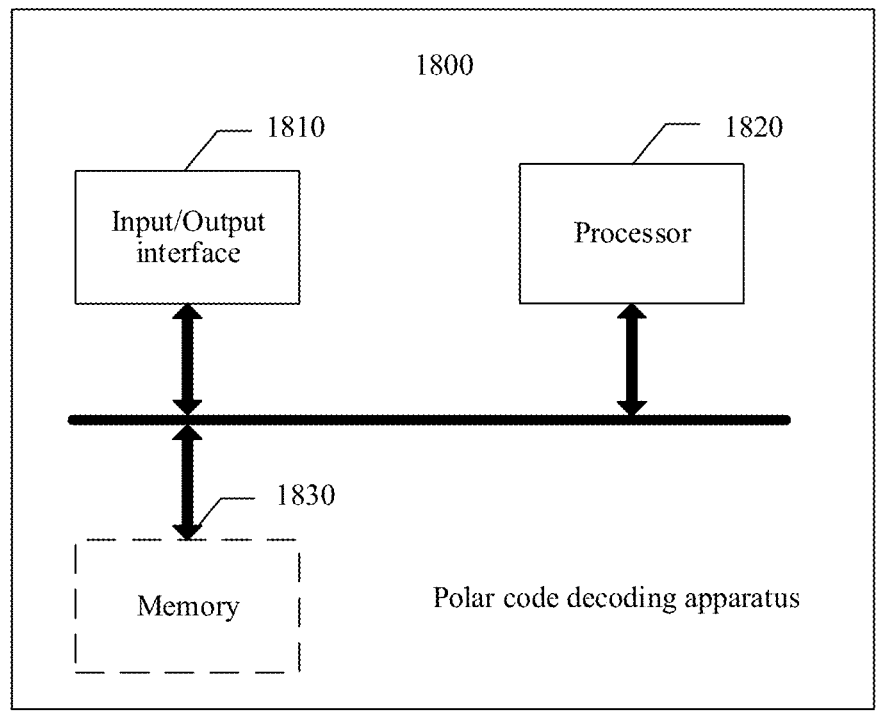
FIG. 18 is a schematic diagram 2 of a structure of a polar decoding apparatus according to some embodiments of this application.

FIG. 18 shows a polar decoding apparatus 1800 according to some embodiments of this application. The apparatus is configured to implement the polar decoding method provided in this application. The polar decoding apparatus 1800 may be a terminal device or a network device. The polar decoding apparatus 1800 may be a chip system or a chip. In some embodiments of this application, the chip system may include a chip, or may include a chip and another discrete component. The polar decoding apparatus 1800 includes at least one processor 1820, configured to implement the polar decoding method provided in embodiments of this application. The polar decoding apparatus 1800 may further include an input/output interface 1810. In some embodiments of this application, the input/output interface 1810 is configured to communicate with another apparatus by using a transmission medium. For example, when the polar decoding apparatus 1800 is a chip, the polar encoding apparatus performs transmission with another chip or device through the input/output interface 1810. The processor 1820 is configured to implement the method in the foregoing method embodiments.

In some embodiments, the processor 1820 is configured to: obtain to-be-decoded source information, where the to-be-decoded source information includes assistance information; perform first decoding on the to-be-decoded source information to obtain L candidate vectors, where L is a positive integer; determine a first vector in the L candidate vectors based on assistance information, where the assistance information is check bits or indication information, and the indication information indicates a sequence number of the first vector in the L candidate vectors; and perform polarization transformation on the first vector to obtain a source decoding result.

The input/output interface 1810 is configured to output the source decoding result.

In some embodiments, the input/output interface 1810 is configured to obtain to-be-decoded channel information.

The processor 1820 is configured to perform second decoding on the to-be-decoded channel information to obtain a channel decoding result, where a path metric value corresponding to an $n1^{th}$ channel information bit is determined based on the following information: a path metric value corresponding to an $(n1-1)^{th}$ channel information bit, a path metric increment corresponding to the $n1^{th}$ channel information bit, and a metric value corresponding to an $n2^{th}$ source fixed bit obtained when first decoding is performed on the to-be-decoded source information to obtain the $n2^{th}$ source fixed bit, where n1 and n2 are both positive integers.

The processor 1820 may further perform other operations of the decoding method in the foregoing method embodiments. Details are not described herein again.

The polar decoding apparatus 1800 may further include at least one memory 1830, configured to store program instructions and/or data. The memory 1830 is coupled to the processor 1820. The coupling, in some embodiments of this application, may be an indirect coupling or a communication connection between apparatuses, units, or modules in an electrical form, a mechanical form, or another form, and is used for information exchange between the apparatuses, the units, or the modules. The processor 1820 may cooperate with the memory 1830. The processor 1820 may execute the program instructions stored in the memory 1830. At least one of the memory may be integrated with the processor.

In some embodiments of this application, the memory 1830 may be a non-volatile memory, such as an HDD or an SSD, or may be a volatile memory, such as a RAM. The memory is any other medium that can carry or store expected program code in a form of instructions or a data structure and that can be accessed by a computer, but is not limited thereto. The memory in embodiments of this application may alternatively be a circuit or any other apparatus that can implement a storage function, and is configured to store the program instructions and/or the data.

In some embodiments of this application, the processor 1820 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor or any conventional processor or the like. The steps of the methods disclosed with reference to embodiments of this application may be directly performed by a hardware processor, or may be performed by using a combination of hardware in the processor and a software module.

Figure 19:
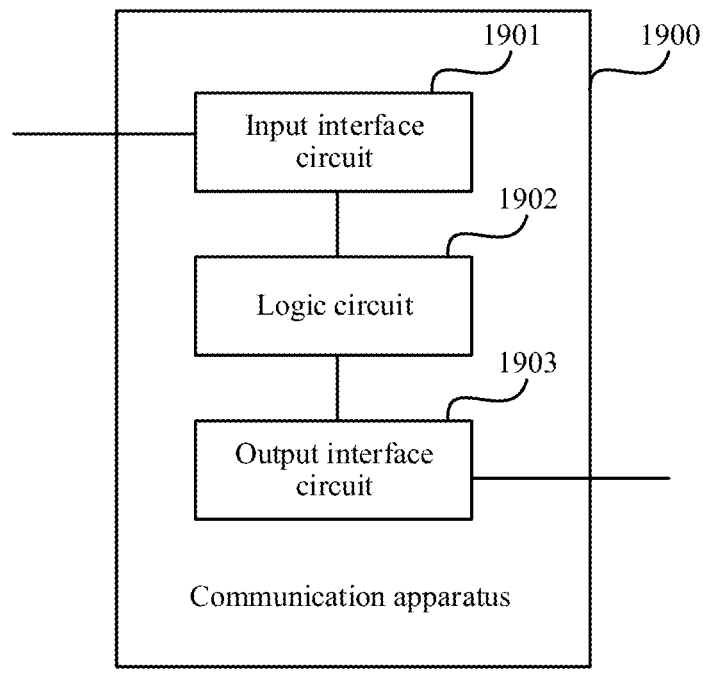
FIG. 19 is a schematic diagram of a structure of a communication apparatus according to some embodiments of this application.

FIG. 19 shows a communication apparatus 1900 according to some embodiments of this application. The apparatus is configured to implement the method provided in this application. The communication apparatus 1900 may be configured to implement the encoding method provided in embodiments of this application, or may be configured to implement the decoding method provided in embodiments of this application. When the encoding method is implemented, the communication apparatus 1900 may be an encoding apparatus, may be an apparatus located in the encoding apparatus, or may be an apparatus that can match the encoding apparatus. When the decoding method is implemented, the communication apparatus 1900 may be a decoding apparatus, may be an apparatus located in the decoding apparatus, or may be an apparatus that can match the decoding apparatus.

The communication apparatus 1900 may be a chip system or a chip. In some embodiments of this application, the chip system may include a chip, or may include a chip and another discrete component. Some or all of the methods provided in the foregoing embodiments may be implemented by hardware or software. When the methods are implemented by hardware, the communication apparatus 1900 includes an input interface circuit 1901, a logic circuit 1902, and an output interface circuit 1903.

When the communication apparatus 1900 is configured to implement the encoding method, The input interface circuit 1901 is configured to obtain to-be-encoded source bits. The logic circuit 1902 is configured to perform first polar encoding on the to-be-encoded source bits to obtain encoded source bits, where the first polar encoding includes first transformation and second transformation, the first transformation is polarization transformation, a mother code length corresponding to the first transformation is Ns, the polarization transformation is performed on the to-be-encoded source bits to obtain first source bits, and the second transformation is performed on the first source bits to obtain the encoded source bits; and determine assistance information based on the first source bits. The output interface circuit 1903 is configured to output a source coding codeword, where the source coding codeword includes the encoded source bits and the assistance information.

When the communication apparatus 1900 is configured to implement the decoding method, in some embodiments, the input interface circuit 1901 is configured to obtain to-be-decoded source information, where the to-be-decoded source information includes assistance information. The logic circuit 1902 is configured to perform first decoding on the to-be-decoded source information to obtain L candidate vectors, where L is a positive integer; determine a first vector in the L candidate vectors based on assistance information, where the assistance information is check bits or indication information, and the indication information indicates a sequence number of the first vector in the L candidate vectors; and perform polarization transformation on the first vector to obtain a source decoding result. The output interface circuit 1903 is configured to output the source decoding result.

When the communication apparatus 1900 is configured to implement the decoding method, in another embodiment, the input interface circuit 1901 is configured to obtain to-be-decoded channel information. The logic circuit 1902 is configured to perform second decoding on the to-be-decoded channel information to obtain a channel decoding result, where a path metric value corresponding to an $n1^{th}$ channel information bit is determined based on the following information: a path metric value corresponding to an $(n1-1)^{th}$ channel information bit, a path metric increment corresponding to the $n1^{th}$ channel information bit, and a metric value corresponding to an $n2^{th}$ source fixed bit obtained when first decoding is performed on the to-be-decoded source information to obtain the $n2^{th}$ source fixed bit, where n1 and n2 are both positive integers.

Optionally, in some embodiments, the communication apparatus 1900 may be a chip or an integrated circuit.

The logic circuit 1902 may further perform other operations of the encoding method or the decoding method in the foregoing method embodiments. Details are not described herein again.

In some embodiments of this application, when an apparatus for implementing a coding method is a terminal device and an apparatus for implementing a decoding method is a network device, or when an apparatus for implementing a coding method is a network device and an apparatus for implementing a decoding method is a terminal device, the coding method and/or the decoding method provided in embodiments of this application may be applied to a communication system. An architecture of the communication system includes a network device and a terminal device. The communication system may be a 5G communication system, for example, a 5G NR system, or may be applied to various future evolved communication systems, for example, a 6G communication system or a space-air-sea-ground integrated communication system.

Figure 20:
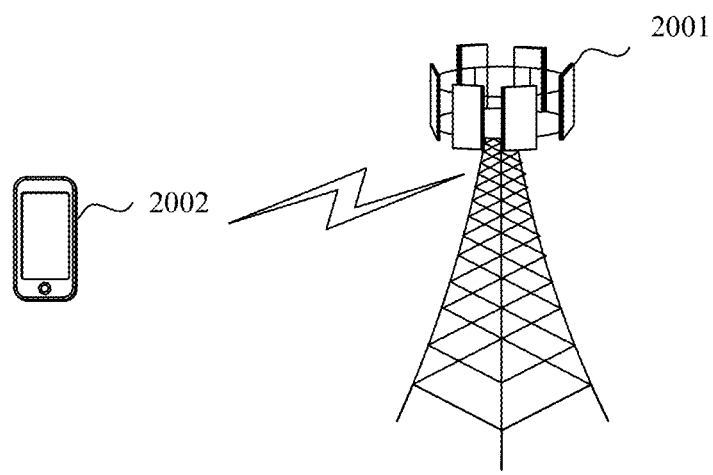
FIG. 20 is a schematic diagram of an architecture of a communication system according to some embodiments of this application.

Possible implementation forms and functions of the terminal device and the network device are described by using the following examples. A network device 2001 provides a service for a terminal device 2002 within a coverage area of the network device. Refer to FIG. 20. For example, the network device 2001 provides radio access for one or more terminal devices 2002 within the coverage area of the network device 2001.

The network device 2001 is a node in a radio access network (RAN), and may also be referred to as a base station, or may be referred to as a RAN node (or device). Currently, some examples of the network device 2001 are a gNB, an Ng-eNB, a TRP, an eNB, an RNC, an NB, a BSC, a BTS, a home base station (for example, a home evolved NodeB, or a home NodeB, HNB), a BBU, or a Wi-Fi access point (AP). The network device 2001 may alternatively be a satellite, and the satellite may also be referred to as a high-altitude platform, a high-altitude aircraft, or a satellite base station. Alternatively, the network device 2001 may be another device that has a function of the network device. For example, the network device 2001 may be alternatively a device that functions as a network device in D2D communication, vehicle-to-everything, or M2M communication. Alternatively, the network device 2001 may be any possible network device in a future communication system.

The terminal device 2002 is also referred to as UE, an MS, an MT, or the like, and is a device that provides a user with voice and/or data connectivity. For example, the terminal device 2002 is a handheld device, a vehicle-mounted device, or the like that has a wireless connection function. Currently, the terminal device 2002 may be a mobile phone, a tablet computer, a notebook computer, a palmtop computer, a MID, a wearable device (for example, a smartwatch, a smart band, or a pedometer), a vehicle-mounted device (for example, a vehicle-mounted device on an automobile, a bicycle, an electric vehicle, an aircraft, a ship, a train, or a high-speed train), a VR device, an AR device, a wireless terminal in industrial control, a smart home device (for example, a refrigerator, a television, an air conditioner, or an electricity meter), an intelligent robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an uncrewed aerial vehicle, or an aircraft), or the like. Alternatively, the terminal device 2002 may be another device that has a function of the terminal device. For example, the terminal device 2002 may be alternatively a device that functions as a terminal device in D2D communication, vehicle-to-everything, or M2M communication. Particularly, when communication is performed between network devices, a network device that functions as a terminal device may also be considered as a terminal device.

Some or all of the operations and functions performed by the encoding apparatus, the decoding apparatus, and the communication apparatus described in the foregoing method embodiments of this application may be implemented by a chip or an integrated circuit.

Some embodiments of this application provide a computer-readable storage medium storing a computer program. The computer program includes instructions used to perform the foregoing method embodiments.

Some embodiments of this application provide a computer program product including instructions. When the computer program product runs on a computer, the computer is enabled to perform the foregoing method embodiments.

Persons skilled in the art would understand that embodiments in this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer-readable memory that can instruct the computer or any other programmable data processing device to work, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or a programmable data processing device, so that a series of operations and steps are performed on the computer or the programmable device, so that computer-implemented processing is generated. Therefore, the instructions executed on the computer or the programmable device provide steps for implementing a function in one or more procedures in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

It is clear that persons skilled in the art can make various modifications and variations to embodiments of this application without departing from the scope of embodiments of this application. This application is intended to cover all modifications and variations in embodiments of this application provided that they fall within the scope of protection defined by the following claims in this application and their equivalent technologies.

What is claimed is:

1. A polar encoding method, comprising:
obtaining to-be-encoded source bits;
performing first polar encoding on the to-be-encoded source bits to obtain encoded source bits, wherein the first polar encoding comprises a first transformation and a second transformation, the first transformation is a polarization transformation, a mother code length corresponding to the first transformation is Ns, the polarization transformation is performed on the to-be-encoded source bits to obtain first source bits, and the second transformation is performed on the first source bits to obtain the encoded source bits;
determining assistance information based on the first source bits; and
outputting a source coding codeword, wherein the source coding codeword comprises the encoded source bits and the assistance information.

2. The method according to claim 1, wherein the second transformation comprises one or more of the following operations: a convolution operation, an upper triangular transformation operation, a compression operation, or an interleaving operation.

3. The method according to claim 1, wherein the determining the assistance information based on the first source bits comprises:

performing check coding on the first source bits to obtain check bits, wherein the check bits are the assistance information.

4. The method according to claim 1, wherein the determining the assistance information based on the first source bits comprises:
performing first decoding on the encoded source bits to obtain at least one candidate decoding result;
determining a first decoding result that is in the at least one candidate decoding result and that matches the first source bits; and
determining that indication information of the first decoding result is the assistance information.

5. The method according to claim 4, wherein the performing the first decoding on the encoded source bits to obtain the at least one candidate decoding result comprises: performing the first decoding on the encoded source bits to obtain L candidate vectors, wherein L is a positive integer; and
the determining the first decoding result that is in the at least one candidate decoding result and that matches the first source bits comprises: comparing the L candidate vectors with the first source bits; and determining a first vector in the L candidate vectors that is the same as the first source bits, wherein information about a sequence number of the first vector in the L candidate vectors is the indication information.

6. The method according to claim 5, wherein the method further comprises:
performing second polar encoding on the source coding codeword to obtain a channel coding codeword, wherein a mother code length corresponding to the second polar encoding is Nc; and
outputting the channel coding codeword.

7. The method according to claim 6, wherein m bits in the source coding codeword are flag bits, and m is a positive integer; and
the performing the second polar encoding on the source coding codeword comprises:
mapping, according to a mapping rule, the source coding codeword to information subchannels of a polarization subchannel of the second polar encoding, to obtain to-be-encoded channel bits, wherein the mapping rule comprises interleaving mapping, and the interleaving mapping is: sequentially mapping the source coding codeword to the information subchannels in a natural order to obtain a channel information bit sequence; and exchanging a bit mapped to an information subchannel whose sequence number is $x_i$ and a bit mapped to an information subchannel whose sequence number is $x_j$, to obtain the to-be-encoded channel bits, wherein $x_i$ is a sequence number, in the channel information bit sequence, of an information subchannel to which an $i^{th}$ flag bit in the m flag bits is mapped, and $x_j$ is a sequence number, in the channel information bit sequence, of an information subchannel with lowest reliability in information subchannels whose sequence number range is $[x_i, x_{i+1})$, wherein $x_{i+1}$ is a sequence number, in the channel information bit sequence, of an information subchannel to which an $(i+1)^{th}$ flag bit in the m flag bits is mapped, both i and j are positive integers, and i=1, 2, . . . , m; and
performing second polar encoding on to-be-coded channel bits.

8. The method according to claim 7, wherein reliability of the m flag bits is higher than reliability of other bits except the m flag bits in the encoded source bits.

9. A polar decoding method, comprising:
obtaining to-be-decoded source information, wherein the to-be-decoded source information comprises assistance information;
performing first decoding on the to-be-decoded source information to obtain L candidate vectors, wherein L is a positive integer;
determining a first vector in the L candidate vectors based on the assistance information, wherein the assistance information is check bits or indication information, and the indication information indicates a sequence number of the first vector in the L candidate vectors;
performing polarization transformation on the first vector to obtain a source decoding result; and
outputting the source decoding result.

10. The method according to claim 9, wherein the assistance information is check bits; and
the determining the first vector in the L candidate vectors based on the assistance information comprises:
sequentially checking, based on the check bits, the L candidate vectors in descending order of reliability; and when the check succeeds, determining a candidate vector on which the check succeeds as the first vector.

11. The method according to claim 9, wherein the assistance information is indication information, and the indication information indicates a sequence number of the first vector in the L candidate vectors; and
the determining the first vector in the L candidate vectors based on the assistance information comprises:
determining, based on the indication information, the first vector corresponding to the sequence number indicated by the indication information in the L candidate vectors.

12. The method according to claim 9, wherein the obtaining the to-be-decoded source information comprises:
performing second decoding on to-be-decoded channel information to obtain a channel decoding result, wherein the channel decoding result comprises L1 to-be-decoded candidate source vectors in descending order of reliability, and the to-be-decoded source information is one of the L1 to-be-decoded candidate source vectors.

13. A polar decoding method, comprising:
obtaining to-be-decoded channel information; and
performing second decoding on the to-be-decoded channel information to obtain a channel decoding result, wherein a path metric value corresponding to an $n1^{th}$ channel information bit is determined based on the following information: a path metric value corresponding to an $(n1-1)^{th}$ channel information bit, a path metric increment corresponding to the $n1^{th}$ channel information bit, and a metric value corresponding to an $n2^{th}$ source fixed bit obtained when first decoding is performed on to-be-decoded source information to obtain the $n2^{th}$ source fixed bit, wherein n1 and n2 are both positive integers.

14. The method according to claim 13, wherein the metric value of the $n2^{th}$ source fixed bit obtained by performing the first decoding on the to-be-decoded source information comprises: a path metric value that corresponds to a $1^{st}$ to the $n2^{th}$ source fixed bits and that is obtained when the first decoding is performed on the to-be-decoded source information to obtain the $n2^{th}$ source fixed bit.

15. The method according to claim 13, wherein the metric value of the $n2^{th}$ source fixed bit obtained by performing the first decoding on the to-be-decoded source information comprises: a path metric increment corresponding to the $n2^{th}$ source fixed bit obtained when the first decoding is performed on the to-be-decoded source information to obtain the $n2^{th}$ source fixed bit.

16. The method according to claim 13, wherein an information subchannel on which the $n1^{th}$ channel information bit is located has a mapping relationship with the $n2^{th}$ source fixed bit in the to-be-decoded source information.

17. The method according to claim 16, wherein the mapping relationship is interleaving mapping, and the interleaving mapping is: sequentially mapping encoded source bits to information subchannels in a natural order to obtain a channel information bit sequence, wherein m bits in the encoded source bits are flag bits, and m is a positive integer; and exchanging a bit mapped to an information subchannel whose sequence number is $x_i$ and a bit mapped to an information subchannel whose sequence number is $x_j$, to obtain to-be-encoded channel bits, wherein $x_i$ is a sequence number, in the channel information bit sequence, of an information subchannel to which an $i^{th}$ flag bit in the m flag bits is mapped, and $x_j$ is a sequence number, in the channel information bit sequence, of an information subchannel with lowest reliability in information subchannels whose sequence number range is $[x_i, x_{i+1})$, wherein $x_{i+1}$ is a sequence number, in the channel information bit sequence, of an information subchannel to which an $(i+1)^{th}$ flag bit in the m flag bits is mapped, both i and j are positive integers, and i=1, 2, . . . , m.

18. The method according to claim 13, wherein the path metric value corresponding to the $n1^{th}$ channel information bit is a sum of the following three: the path metric value corresponding to the $(n1-1)^{th}$ channel information bit, the path metric increment corresponding to the $n1^{th}$ channel information bit, and the metric value corresponding to the $n2^{th}$ source fixed bit obtained when second decoding is performed on to-be-decoded source information to obtain the $n2^{th}$ source fixed bit.

19. The method according to claim 13, wherein the method further comprises:
  determining the to-be-decoded source information based on the channel decoding result;
  performing the first decoding on the to-be-decoded source information to obtain L candidate vectors, wherein L is a positive integer;
  determining a first vector in the L candidate vectors based on assistance information, wherein the assistance information is check bits or indication information, and the indication information indicates a sequence number of the first vector in the L candidate vectors;
  performing polarization transformation on the first vector to obtain a source decoding result; and
  outputting the source decoding result.

* * * * *